United States Patent
Tanaka et al.

(10) Patent No.: US 11,847,369 B2
(45) Date of Patent: Dec. 19, 2023

(54) INFORMATION PROCESSING APPARATUS, INFORMATION PROCESSING METHOD, PRINTING SYSTEM, AND STORAGE MEDIUM

(71) Applicant: CANON KABUSHIKI KAISHA, Tokyo (JP)

(72) Inventors: Wakako Tanaka, Tokyo (JP); Takashi Nakamura, Kanagawa (JP); Naoki Sumi, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/891,221

(22) Filed: Aug. 19, 2022

(65) Prior Publication Data
US 2023/0185499 A1    Jun. 15, 2023

(30) Foreign Application Priority Data
Aug. 20, 2021    (JP) .................... 2021-134889

(51) Int. Cl.
*G06F 3/12*    (2006.01)
*G06K 15/10*    (2006.01)

(52) U.S. Cl.
CPC ............ *G06F 3/1243* (2013.01); *G06F 3/121* (2013.01); *G06K 15/102* (2013.01)

(58) Field of Classification Search
CPC ...... G06F 3/121; G06F 3/1243; G06K 15/102
See application file for complete search history.

(56) References Cited

U.S. PATENT DOCUMENTS

| | | | | |
|---|---|---|---|---|
| 10,373,398 B1* | 8/2019 | McBride | .......... | G07B 17/00362 |
| 11,295,407 B2 | 4/2022 | Ishida et al. | | |
| 2003/0080489 A1* | 5/2003 | Huang | .............. | H04N 1/00063 |
| | | | | 271/3.17 |
| 2005/0062776 A1* | 3/2005 | Kojima | .................. | B41J 2/2146 |
| | | | | 347/19 |
| 2013/0222857 A1* | 8/2013 | Nobushima | ........ | G06K 15/1848 |
| | | | | 358/1.18 |
| 2014/0306012 A1* | 10/2014 | Corcoran | ........... | G06K 7/10821 |
| | | | | 235/462.15 |

FOREIGN PATENT DOCUMENTS

| | | |
|---|---|---|
| JP | 2011-248577 A | 12/2011 |
| JP | 2019-009733 A | 1/2019 |

* cited by examiner

*Primary Examiner* — John R Wallace
(74) *Attorney, Agent, or Firm* — Venable LLP

(57) ABSTRACT

An information processing apparatus generates a code for identifying images in imposition image data representing an image print region, determines candidate regions so that codes in print regions in pages represented by the imposition image data will not be printed at a same position, generates print data based on the imposition image data so that the code will be placed in at least one of the determined candidate regions. For the print data, up to a predetermined number of pages represented by pieces of the imposition image data, a print position of the code is same in a first page and a following second page. When a predetermined number of pages represented by the pieces of the imposition image data is reached, the print position of the code is different in the first page and the second page. The generated print data is output to a printing apparatus.

17 Claims, 22 Drawing Sheets

INFORMATION PROCESSING APPARATUS, INFORMATION PROCESSING METHOD, PRINTING SYSTEM, AND STORAGE MEDIUM

CROSS-REFERENCE TO RELATED APPLICATIONS

This application claims the benefit of Japanese Patent Application No. 2021-134889, filed Aug. 20, 2021, which is hereby incorporated by reference herein in its entirety.

BACKGROUND OF THE INVENTION

Field of the Invention

The present invention relates to a technique for inspecting a printed product output from a printing apparatus.

Description of the Related Art

In recent years, the number of printing apparatuses that perform variable printing has increased. Variable printing means consecutively printing individually different figures without using printing plates.

In Japanese Patent Laid-Open No. 2011-248577 (here after referred to as the '577 document), in each page of a printed product to be inspected, identification information is printed that represents the original image data to be compared associated with the page. The identification information is printed in the form of a one-dimensional barcode, a two-dimensional barcode, a numerical value, or the like (here after collectively referred to as a "code"). When a printed product to be inspected is read, the code is read at the same time, and the read printed product is compared with the associated original data to inspect quality of the printed product.

SUMMARY OF THE INVENTION

Defects can appear on a printed product due to various factors associated with the apparatus. In particular, trouble occurring at a specific part of the apparatus may consecutively appear as an image defect at a fixed position on print media. If the position where the defect continues to appear and the position, where a code for inspecting variable printing is embedded, overlap, there is a possibility of failing to execute the normal inspection.

An information processing apparatus according to one aspect of the present invention includes a code generation unit configured to generate a code for identifying one or more images in a piece of imposition image data representing a print region with the images arranged therein, a candidate region determination unit configured to determine candidate regions in the print region serving as candidates for placing the code, so that the codes in the print regions in pages represented by multiple pieces of the imposition image data will not be printed at a same position, a print data generation unit configured to generate print data based on the imposition image data so that the code will be placed in at least one of the candidate regions determined by the candidate region determination unit, and an output unit configured to output the generated print data to a printing apparatus.

Further features of the present invention will become apparent from the following description of exemplary embodiments with reference to the attached drawings.

DESCRIPTION OF THE EMBODIMENTS

Embodiment 1

An embodiment of the present invention will be described with reference to the drawings. In some drawings, arrows X and Y represent directions that are orthogonal to each other. An arrow Z represents an up-down direction.

<Printing System>

Figure 1:
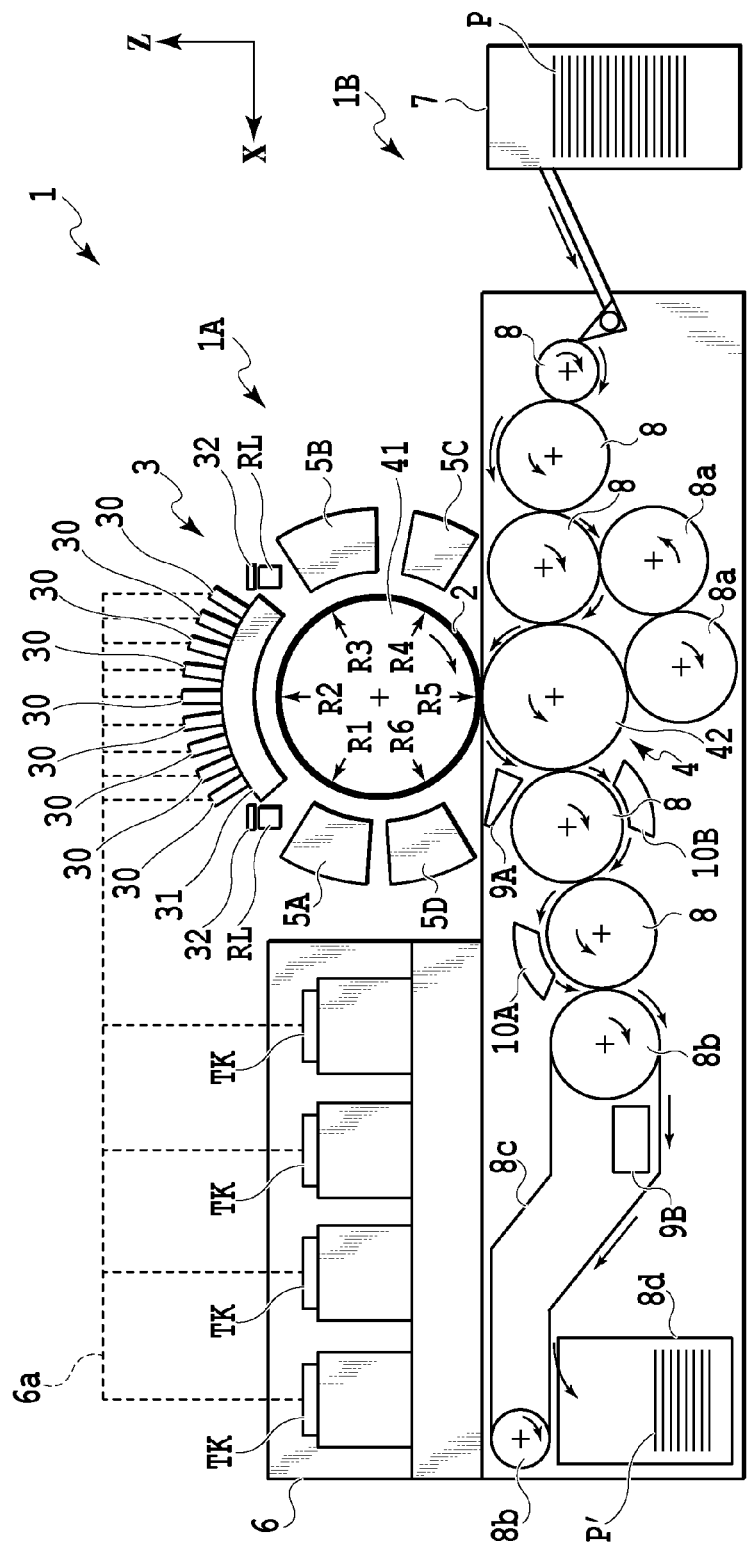
FIG. 1 is a schematical diagram of a printing system.

FIG. 1 is a front view schematically illustrating a printing system 1 according to an embodiment of the present invention. The printing system 1 is a sheet-fed inkjet printer that produces a printed product P' by transferring an ink image onto a print medium P via a transfer member 2. The printing system 1 includes a printing apparatus 1A and a conveyance apparatus 1B. In the present embodiment, the X direction, Y direction, and Z direction represent the width direction (longitudinal direction), depth direction, and height direction of the printing system 1, respectively. The print medium P is conveyed in the X direction.

Note that the term "print" herein is not limited to formation of meaningful information such as characters or a figure, and includes formation of meaningful information and also meaningless information. The term represents a wide range of meanings such as formation of an image, a design, a pattern, or the like, on a print medium and processing of a print medium, and is not limited by whether what is to be "printed" is elicited so as to be visually perceptible to humans. Also, in the present embodiment, a "print medium" is assumed to be a paper sheet but may be a fabric, a plastic film, or the like.

While the components of the inks are not particularly limited, the present embodiment assumes a case of using aqueous pigment inks each containing a pigment, which is a color material, water, and a resin.

<Printing Apparatus>

The printing apparatus 1A includes a printing unit 3, a transfer unit 4, peripheral units 5A to 5D, and a supply unit 6.

<Printing Unit>

Figure 2:
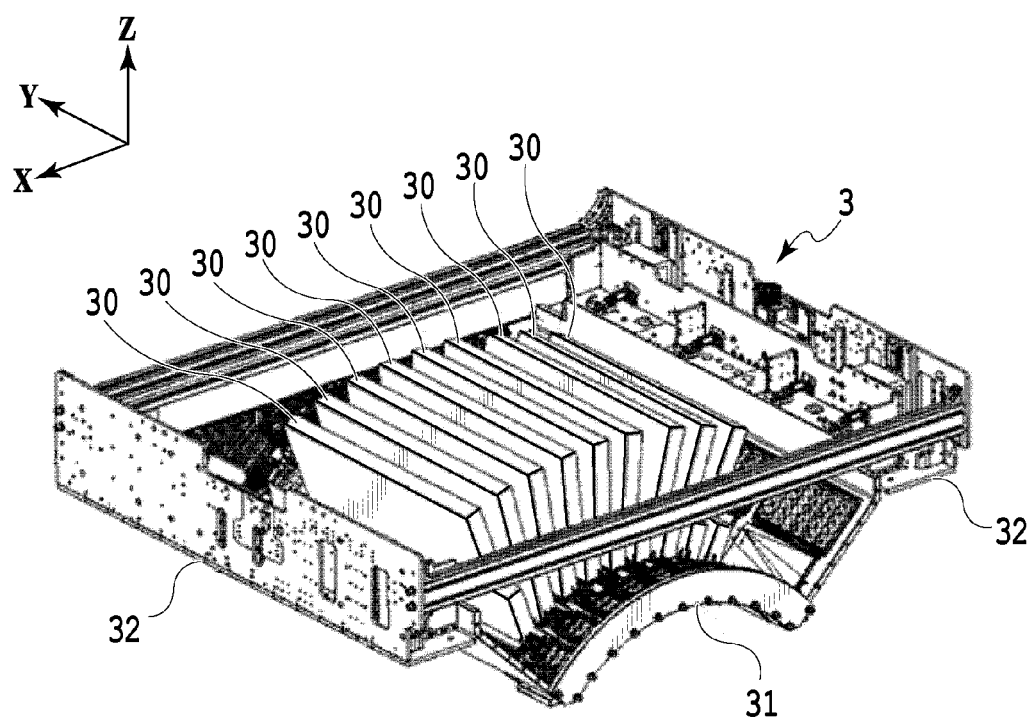
FIG. 2 is a perspective view of a printing unit.
Figure 3:
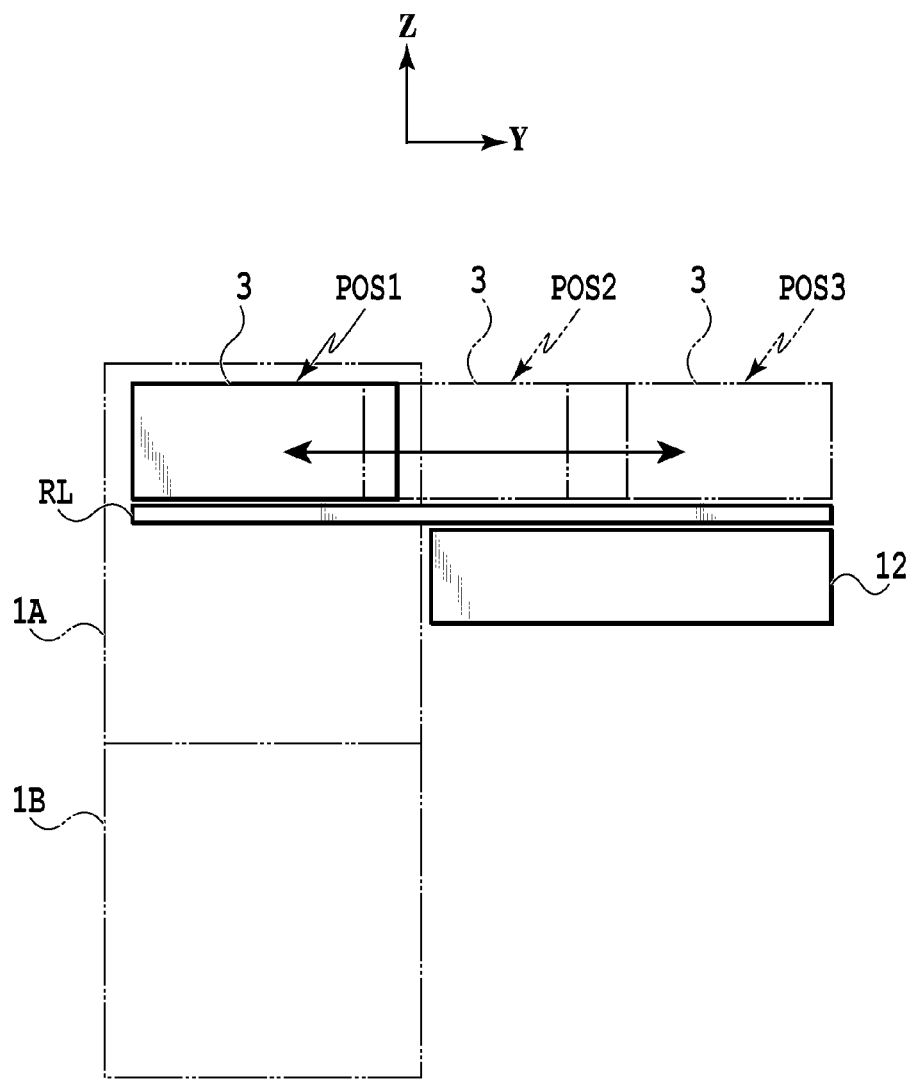
FIG. 3 is a diagram describing how the printing unit is displaced.

The printing unit 3 includes a plurality of print heads 30 and a carriage 31. Now, refer to FIGS. 1 and 2. FIG. 2 is a perspective view of the printing unit 3. Each print head 30 ejects a liquid ink onto the transfer member 2 to thereby form an ink image, which represents an image to be printed, on the transfer member 2.

Figure 8:
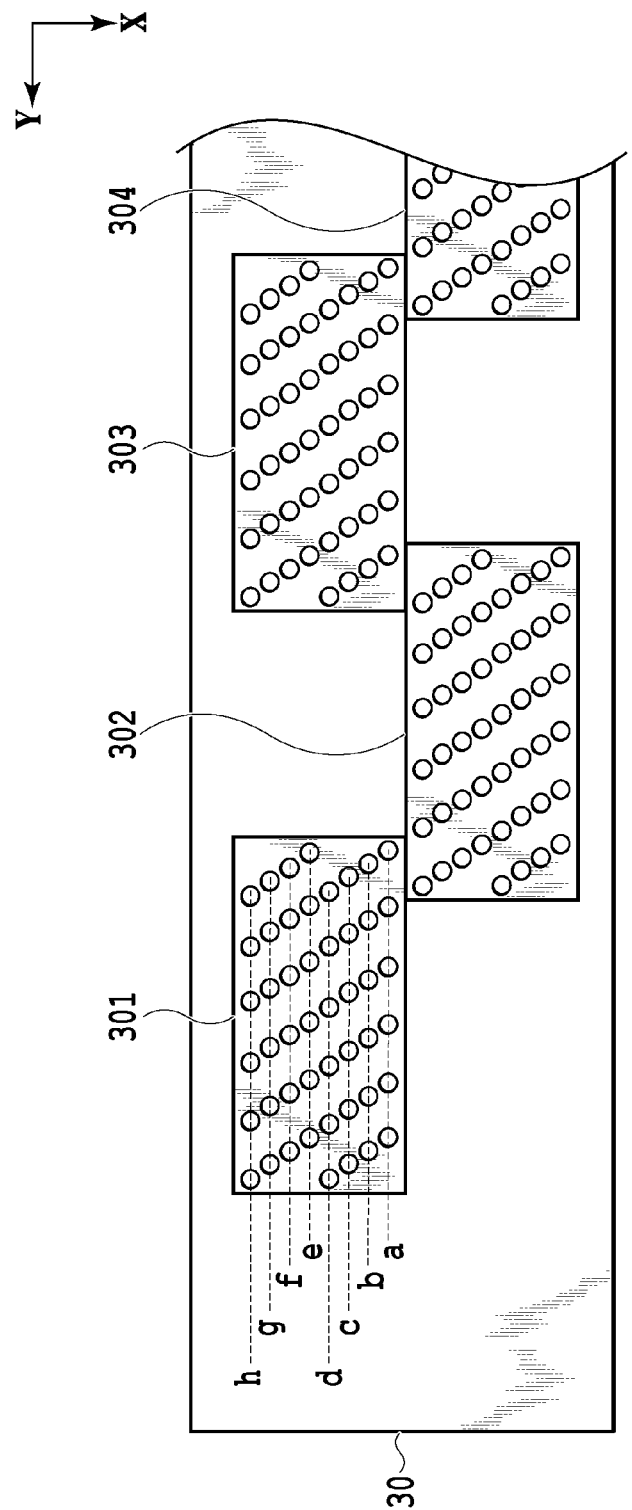
FIG. 8 is a diagram illustrating a nozzle arrangement of a print head.

In the present embodiment, each print head 30 is a full-line head extending in the Y direction, with nozzles arrayed in a range covering the width of an image placement region on a print medium having the largest usable size. In its lower surface, the print head 30 has an ink ejection surface at which the nozzles are open. The ink ejection surface faces the surface of the transfer member 2 with a small gap (e.g., several mm) therebetween. FIG. 8 is a diagram illustrating a nozzle arrangement of a print head 30. As illustrated in the diagram, the print head 30 includes a plurality of ejection substrates 301, 302, 303, 304, . . . disposed so as to overlap in the Y direction. In each ejection substrate, eight nozzle arrays a to h each extending in a nozzle arrangement direction are arranged in lines. The nozzle intervals of each nozzle array in the Y direction are 1200 dpi. Here, the nozzle arrays a to h are disposed to be offset from one another by ¼ of 1200 dpi in the X direction. The ejection substrates 301, 302, 303, 304, . . . are disposed along the nozzle arrangement direction, and a plurality of print heads 30 in which similar nozzles are arrayed are disposed side by side in a direction crossing the nozzle arrangement direction. The print heads 30 eject inks of a plurality of colors onto corresponding regions on a print medium to print an image. In the present embodiment, the transfer member 2 is configured to cyclically move on a circular locus, and the plurality of print heads 30 are therefore disposed radially.

Each nozzle is provided with an ejection element. The ejection element is, for example, an element that generates a pressure inside the nozzle to eject the ink in the nozzle, and can employ the technology of the inkjet head of a publicly known inkjet printer. Examples of the ejection element include an element that forms a bubble by causing film boiling in an ink with an electrothermal transducer to eject the ink, an element that ejects an ink with an electromechanical transducer, an element that ejects an ink by utilizing static electricity, and so on. From the viewpoint of performing high-speed and high-density printing, an ejection element utilizing an electrothermal transducer can be used.

In the present embodiment, nine print heads 30 are provided. The print heads 30 eject different types of inks. The different types of inks refer to, for example, inks with different color materials, and are inks such as yellow ink, magenta ink, cyan ink, and black ink. A single print head 30 ejects a single type of ink but may be configured to eject a plurality of types of inks. In a case when a plurality of print heads 30 are provided as above, one of them may eject an ink containing no color material (e.g., clear ink).

The carriage 31 supports the plurality of print heads 30. The end of each print head 30 on the ink ejection surface side is fixed to the carriage 31. In this way, the gap between the ink ejection surface and the surface of the transfer member 2 can be maintained more precisely. The carriage 31 is configured to be capable of being displaced while carrying the print heads 30 by being guided by guide members RL. In the present embodiment, the guide members RL are a pair of rail members extending in the Y direction and separated from each other in the X direction. Slide portions 32 are provided on side portions of the carriage 31 in the X direction. The slide portions 32 are engaged with the guide members RL and slide along the guide members RL in the Y direction.

<Transfer Unit>

The transfer unit 4 will be described with reference to FIG. 1. The transfer unit 4 includes a transfer drum (transfer cylinder) 41 and an impression cylinder 42. These cylinders are rotation members that rotate about respective rotation axes extending in the Y direction, and have cylindrical outer peripheral surfaces. In FIG. 1, arrows illustrated in the figures of the transfer drum 41 and the impression cylinder 42 indicate their rotation directions. The transfer drum 41 rotates clockwise and the impression cylinder 42 rotates counterclockwise.

The transfer drum 41 is a support member that supports the transfer member 2 on its outer peripheral surface. The transfer member 2 (intermediate transfer member) is provided on the outer peripheral surface of the transfer drum 41 in a circumferentially continuous or intermittent form. In the case when the transfer member 2 is provided in a continuous form, it is formed in the shape of an endless belt. In the case when the transfer member 2 is provided in an intermittent form, it is formed as a plurality of segments divided in the shape of belts with ends, which can be disposed in the shape of arcs at equal pitches on the outer peripheral surface of the transfer drum 41.

As the transfer drum 41 is rotated, the transfer member 2 is moved cyclically on a circular locus. Based on the rotational phase of the transfer drum 41, the position of the transfer member 2 can be identified as a pre-ejection processing region R1, an ejection region R2, a post-ejection processing region R3 or R4, a transfer region R5, or a post-transfer processing region R6. The transfer member 2 cyclically passes these regions.

The pre-ejection processing region R1 is a region where pre-processing is performed on the transfer member 2 before ink ejection by the printing unit 3, and is a region where a process by the peripheral unit 5A is performed. In the present embodiment, a reaction liquid is applied. The ejection region R2 is a formation region where the printing unit 3 ejects the inks onto the transfer member 2 to form an ink image. The post-ejection processing regions R3 and R4 are processing regions where processes are performed on the ink image after the ink ejection. The post-ejection processing region R3 is a region where a process by the peripheral unit 5B is performed, and the post-ejection processing region R4 is a region where a process by the peripheral unit 5C is performed. The transfer region R5 is a region where the ink image on the transfer member 2 is transferred onto the print medium P by the transfer unit 4. The post-transfer processing region R6 is a region where post-processing is performed on the transfer member 2 after the transfer, and is a region where a process by the peripheral unit 5D is performed.

In the present embodiment, the ejection region R2 is a region having a certain length. The other regions R1 and R3 to R6 are shorter than the ejection region R2. Using the analogy of a clock face, in the present embodiment, the pre-ejection processing region R1 is roughly at the ten o'clock position, the ejection region R2 is roughly at the eleven to one o'clock range, the post-ejection processing region R3 is roughly at the two o'clock position, and the post-ejection processing region R4 is roughly at the four o'clock position. The transfer region R5 is roughly at the six o'clock position, and the post-transfer processing region R6 is roughly at the eight o'clock region.

The outer peripheral surface of the impression cylinder 42 is in pressure contact with the transfer member 2. The outer peripheral surface of the impression cylinder 42 is provided with at least one gripping mechanism that holds the leading edge of the print medium P. A plurality of gripping mechanisms may be provided to be separated in the circumferential direction of the impression cylinder 42. The print medium P is conveyed in intimate contact with the outer peripheral surface of the impression cylinder 42, and the ink image on the transfer member 2 is transferred when the print medium P passes the nip portion between the impression cylinder 42 and the transfer member 2.

The transfer drum 41 and the impression cylinder 42 share a driving source, such as a motor, for driving themselves, and a driving force can be distributed to them via a transmission mechanism, such as a gear mechanism.

<Peripheral Unit>

The peripheral units 5A to 5D are disposed around the transfer drum 41. In the present embodiment, the peripheral units 5A to 5D are an application unit, an absorption unit, a heating unit, and a cleaning unit, respectively.

The application unit 5A is a mechanism that applies a reaction liquid onto the transfer member 2 before ink ejection by the printing unit 3. The reaction liquid is a liquid containing a component that increases the viscosity of the inks. Here, increasing the viscosity of the inks means to bring the color materials, the resin, etc. forming the inks into contact with a component that increases the viscosity of the inks to thereby induce a chemical reaction or physical adsorption, so that a rise in the viscosity of the inks is observed. Increasing the viscosity of the inks is not limited only to the case when a rise in the viscosity of the entire inks is observed but also includes a case when the viscosity is locally raised via aggregation of part constituent components of the inks such as the color materials and the resin.

The component that increases the viscosity of the inks may be a metallic ion, a polymeric aggregation agent, or the like. While the component is not particularly limited, it is possible to use a substance that induces a change in the pH of the inks to aggregate the color materials in the inks, and an organic acid is usable. Examples of a mechanism for applying the reaction liquid include a roller, a print head, a die coating device (die coater), a blade coating device (blade coater), and so on. Applying the reaction liquid onto the transfer member 2 before ink ejection onto the transfer member 2 enables immediate fixing of the inks having reached the transfer member 2. This can prevent bleeding in which adjacent inks get mixed.

The absorption unit 5B is a mechanism that absorbs the liquid components of the ink image on the transfer member 2 before the transfer. Reducing the liquid components of the ink image can prevent bleeding, or the like, of the image to be printed on the print medium P. To describe the reduction of the liquid components from a different viewpoint, it may be expressed as a concentration of the inks forming the ink image on the transfer member 2. Concentrating the inks means increasing the ratio of the content of the solids such as the color materials and resin contained in the inks to the liquid components contained in the inks as a result of reducing the liquid components.

The absorption unit 5B includes, for example, a liquid absorption member that comes into contact with the ink image to reduce the amount of the liquid components in the ink image. The liquid absorption member may be formed on the outer peripheral surface of a roller. Alternatively, the liquid absorption member may be formed in the form of an endless sheet and run in a cyclic manner. In view of protecting the ink image, the movement speed of the liquid absorption member may be set to be equal to the circumferential speed of the transfer member 2 to move the liquid absorption member in synchronization with the transfer member 2.

The liquid absorption member may contain a porous body that contacts the ink image. The pore size of the porous body at its surface that contacts the ink image may be 10 μm or less in order to prevent attachment of the solids in the inks to the liquid absorption member. Here, the pore size refers to an average size, which can be measured by a publicly known method such as a mercury intrusion method, a nitrogen adsorption method, or SEM image observation, for example. Note that the liquid components are not particularly limited as long as they do not have a constant shape but have fluidity and their volume is substantially constant. Examples of the liquid components include the water, organic solvents, and so on, contained in the inks and the reaction liquid.

The heating unit 5C is a mechanism that heats the ink image on the transfer member 2 before the transfer. Heating the ink image melts the resin in the ink image, which improves the transferability of the ink image onto the print medium P. The heating temperature can be the minimum film forming temperature (MFT) of the resin or higher. The MFT can be measured with an apparatus complying with a generally known method, e.g., JIS K 6828-2:2003 or ISO 2115:1996. From the viewpoint of transferability and image robustness, the ink image may be heated at a temperature higher than the MFT by 10° C. or more and may even be heated at a temperature higher by 20° C. or more. As the heating unit 5C, publicly known heating devices such as various lamps using infrared radiation, or the like, and a hot-air fan are usable, for example. From the viewpoint of heating efficiency, an infrared heater can be used.

The cleaning unit 5D is a mechanism that cleans the top of the transfer member 2 after the transfer. The cleaning unit 5D removes the inks remaining on the transfer member 2 and dust, and the like, on the transfer member 2. The cleaning unit 5D can use a publicly known cleaning method as appropriate, e.g., a method involving bringing a porous member into contact with the transfer member 2, a method involving rubbing the surface of the transfer member 2 with a brush, or a method involving scraping the surface of the transfer member 2 with a blade. Also, the cleaning member to be used in the cleaning can be in a publicly known form such as a roller or a web.

As described above, in the present embodiment, the application unit 5A, the absorption unit 5B, the heating unit 5C, and the cleaning unit 5D are included as peripheral units, and some of them may be given a function of cooling the transfer member 2 or a cooling unit may be added. In the present embodiment, the heat of the heating unit 5C may raise the temperature of the transfer member 2. If the printing unit 3 ejects the inks onto the transfer member 2 and then the ink image exceeds the boiling point of water, which is the main solvent of the inks, this may lower the performance of absorbing the liquid components with the absorption unit 5B. The performance of cooling the liquid components can be maintained by cooling the transfer member 2 so as to keep the ejected inks under the boiling point of water.

The cooling unit may be an air blowing mechanism that blows air to the transfer member 2, or a mechanism that brings a member (e.g., a roller) into contact with the transfer member 2 and cools this member with air or water. Alternatively, the cooling unit may be a mechanism that cools the cleaning member of the cleaning unit 5D. The cooling timing may be a period after the transfer but before the application of the reaction liquid.

<Supply Unit>

The supply unit 6 is a mechanism that supplies the inks to the print heads 30 of the printing unit 3. The supply unit 6 may be provided on the back side of the printing system 1. For each type of ink, the supply unit 6 includes a reservoir unit TK containing the ink. Each reservoir unit TK may include a main tank and a sub tank. The reservoir units TK and the print heads 30 communicate with each other through a channel 6a, and the inks are supplied to the print heads 30 from the reservoir units TK. The channel 6a may be a channel through which the inks are circulated between the reservoir units TK and the print heads 30, and the supply unit 6 may include a pump, or the like, which circulates the inks. At an intermediate portion of the channel 6a or the reservoir units TK, a deaeration mechanism may be provided that releases bubbles in the inks. At an intermediate portion of the channel 6a or the reservoir units TK, a valve may be provided that makes an adjustment between the liquid pressure of the inks and the atmospheric pressure. The heights of the reservoir units TK and the print heads 30 in the Z direction may be designed such that the liquid surfaces of the inks in the reservoir units TK are located lower than the ink ejection surfaces of the print heads 30.

<Conveyance Apparatus>

The conveyance apparatus 1B is an apparatus that feeds a print medium P to the transfer unit 4 and discharges a printed product P' on which an ink image has been transferred from the transfer unit 4. The conveyance apparatus 1B includes a feeding unit 7, a plurality of conveyance cylinders 8 and 8a, two sprockets 8b, a chain 8c, and a collection unit 8d. In FIG. 1, the arrow inside the figure of each component of the conveyance apparatus 1B indicates the rotation direction of that component, while the arrows on the outside indicate the conveyance path for the print medium P or the printed product P'. The print medium P is conveyed from the feeding unit 7 to the transfer unit 4, and the printed product P' is conveyed from the transfer unit 4 to the collection unit 8d. The feeding unit 7 side in the conveyance direction may be referred to as "upstream", and the collection unit 8d side may be referred to as "downstream".

The feeding unit 7 includes a stacking portion where a plurality of print media P are stacked, and a feeding mechanism that feeds the print media P one by one from the stacking portion to the most upstream conveyance cylinder 8. Each of the conveyance cylinders 8 and 8a is a rotation member that rotates about a rotation axis extending in the Y direction, and has a cylindrical outer peripheral surface. The outer peripheral surface of each of the conveyance cylinders 8 and 8a is provided with at least one gripping mechanism that holds the leading edge of the print medium P (or the printed product P'). Each gripping mechanism's gripping and releasing operations are controlled so as to pass the print medium P from one conveyance cylinder to the adjacent conveyance cylinder.

The two conveyance cylinders 8a are conveyance cylinders for flipping the print medium P. In a case of performing double-sided printing on the print medium P, the print medium P is passed to the conveyance cylinders 8a from the impression cylinder 42 after transfer onto the front surface, instead of being passed to the adjacent downstream conveyance cylinder 8. The print medium P is flipped by the two conveyance cylinders 8a, and then passed to the impression cylinder 42 again via the conveyance cylinder 8 upstream of the impression cylinder 42. As a result, the back surface of the print medium P faces the transfer drum 41, and an ink image is transferred onto the back surface.

The chain 8c is wound around the two sprockets 8b. One of the two sprockets 8b is a drive sprocket, and the other is a driven sprocket. As the driven sprocket rotates, the chain 8c is run cyclically. The chain 8c is provided with a plurality of gripping mechanisms separated in the longitudinal direction of the chain 8c. The gripping mechanisms grip edges of the printed product P'. The printed product P' is passed from the conveyance cylinder 8 located at the downstream end to the gripping mechanisms of the chain 8c. As the chain 8c is run, the printed product P' gripped by the gripping mechanisms is conveyed to the collection unit 8d and released from the gripped state. As a result, the printed product P' is stacked in the collection unit 8d.

<Post-Processing Units>

The conveyance apparatus 1B is provided with post-processing units 10A and 10B. The post-processing units 10A and 10B are mechanisms that are disposed downstream of the transfer unit 4 and perform post-processing on the printed product P'. The post-processing unit 10A processes the front surface of the printed product P', and the post-processing unit 10B processes the back surface of the printed product P'. Examples of the content of the processing include coating of the image printed surface(s) of the printed product P' for image protection, glossing, or the like. Examples of the content of the coating include application of a liquid, welding of a sheet, lamination, and the like.

<Inspection Units>

The conveyance apparatus 1B is provided with inspection units 9A and 9B. The inspection units 9A and 9B are mechanisms that are disposed downstream of the transfer unit 4 and perform inspections on the printed product P'.

In the present embodiment, the inspection unit 9A is an image capturing device that captures an image of the image printed on the printed product P', and examples thereof include image capturing elements such as a CCD sensor and a CMOS sensor. The inspection unit 9A captures an image of the printed image during its printing operation, which is performed continuously. Based on the image captured by the inspection unit 9A, it is possible to check a secular change in tonality, and the like, of the printed image, and to determine whether or not to correct the image data or the print data. The image capturing range of the inspection unit 9A in the present embodiment is set such that an image of the entire printed product P' can be captured.

In the present embodiment, the inspection unit 9B is also an image capturing device that captures an image of the image printed on the printed product P', and examples thereof include image capturing elements such as a CCD sensor and a CMOS sensor. The inspection unit 9B captures an image of a printed image in a test printing operation. The inspection unit 9B captures an image of the entire printed image. Based on the image captured by the inspection unit 9B, it is possible to determine basic settings for various corrections for the print data. In the present embodiment, the inspection unit 9B is disposed at a position from which an image of the printed product P' conveyed by the chain 8c can be captured. To capture an image of a printed image with the inspection unit 9B, the running of the chain 8c is temporarily stopped, and an image of the entire printed image is captured. The inspection unit 9B may be a scanner that is scanned over the printed product P'.

<Control Unit>

Figure 4:
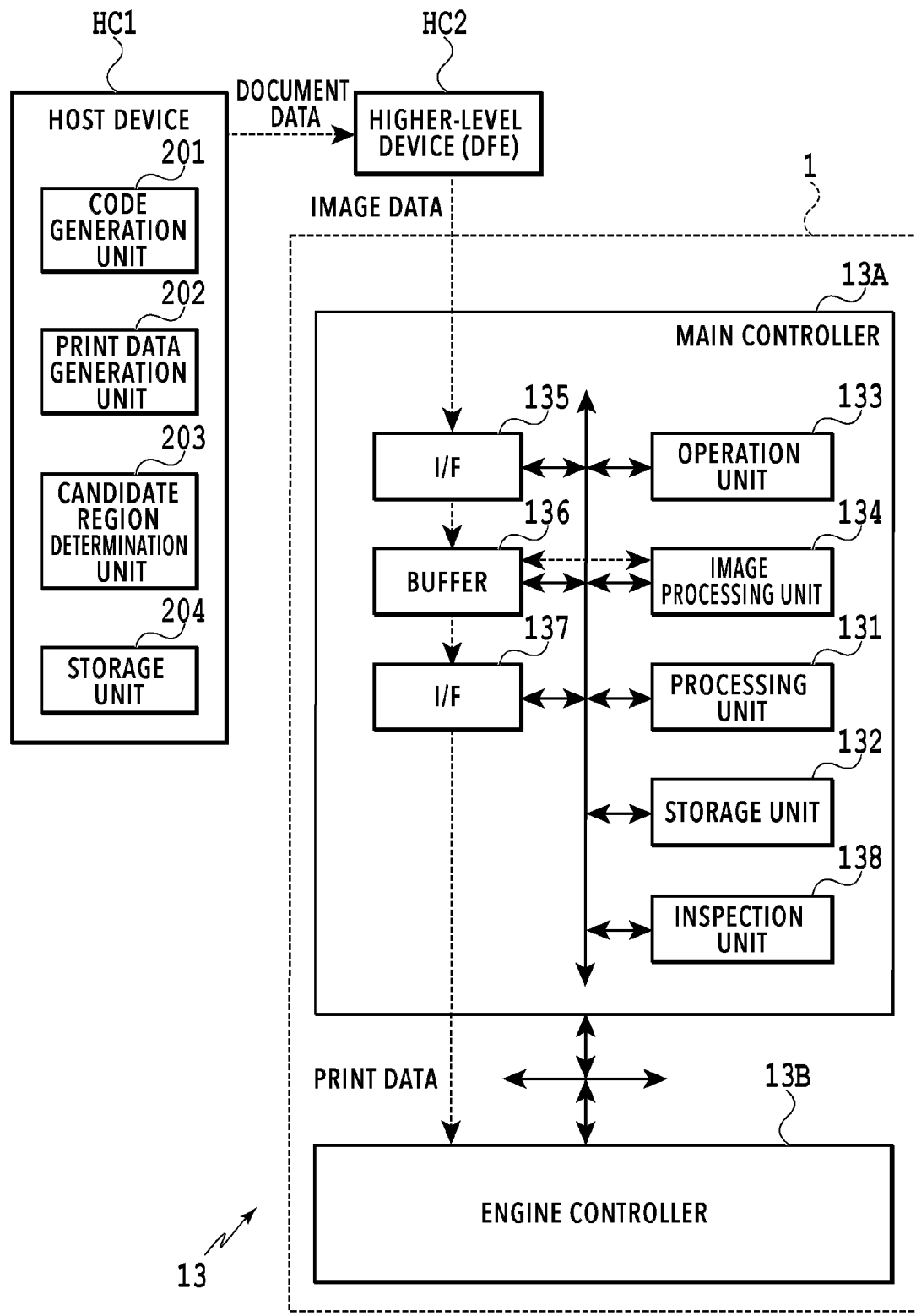
FIG. 4 is a block diagram of a control unit of the printing system.
Figure 5:
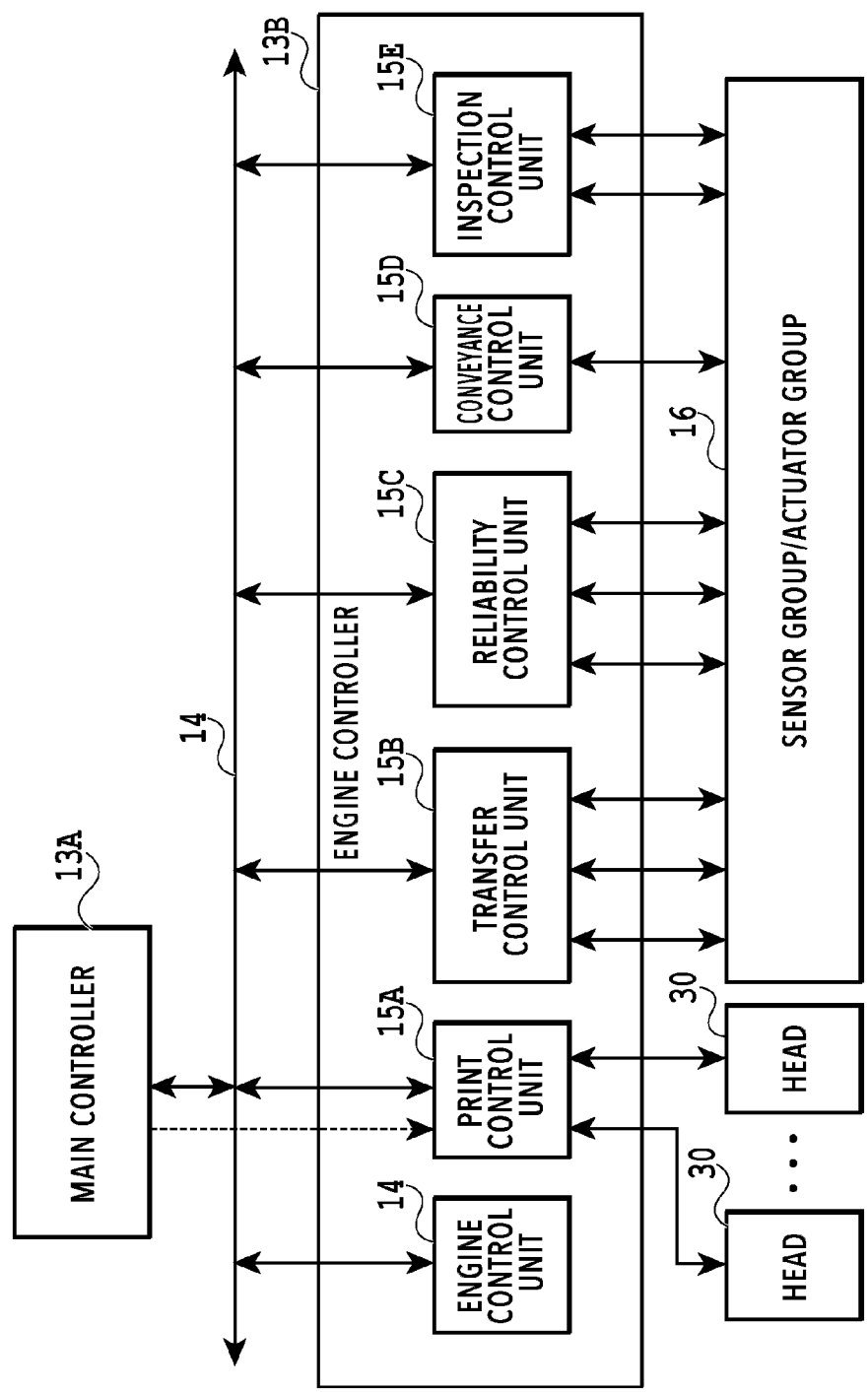
FIG. 5 is a block diagram of the control unit of the printing system.

Next, a control unit of the printing system 1 will be described. FIGS. 4 and 5 are block diagrams of a control unit 13 of the printing system 1. The control unit 13 is communicatively connected to a higher-level device (DFE) HC2, which is communicatively connected to a host device HC1.

The host device HC1 generates or stores document data serving as a source for an image to be printed. The document data here is generated in the format of an electronic file such as a document file or an image file, for example. In the generation of this document data, the document data to be obtained is embedded with an inspection code that will be used in an inspection to be performed in response to printing the document data. Methods of embedding the code will be described in detail in the later-described embodiments.

This document data is sent to the higher-level device HC2, which converts the received document data into a data format supported by the control unit 13 (e.g., RGB data expressing an image with red (R), green (G), and blue (B)). The converted data is sent as image data from the higher-level device HC2 to the control unit 13, which starts a printing operation based on the received image data.

In the present embodiment, the control unit 13 is broadly divided into a main controller 13A and an engine controller 13B. The main controller 13A includes a processing unit 131, a storage unit 132, an operation unit 133, an image processing unit 134, a communication interface (I/F) 135, a buffer 136, a communication I/F 137, and an inspection unit 138.

The processing unit 131 is a processor, such as a CPU, and executes a program stored in the storage unit 132 to comprehensively control the main controller 13A. The storage unit 132 is a storage device, such as a RAM, a ROM, a hard disk drive, or an SSD, and stores programs to be executed by the CPU 131 and data, and also provides a work area to the CPU 131. The operation unit 133 is, for example, input devices, such as a touchscreen, a keyboard, and a mouse, and receives user instructions.

The image processing unit 134 is, for example, an electronic circuit having an image processing processor. The buffer 136 is, for example, a RAM, a hard disk drive, or an SSD. The communication I/F 135 performs communication with the higher-level device HC2, and the communication I/F 137 performs communication with the engine controller 13B. In FIG. 4, the dashed arrows exemplarily represent the flow of processing of image data. The image data received from the higher-level device HC2 via the communication I/F 135 is accumulated in the buffer 136. The image processing unit 134 reads the image data out of the buffer 136, performs predetermined image processing on the read image data, and stores that data in the buffer 136 again. The image data after the image processing stored in the buffer 136 is sent from the communication I/F 137 to the engine controller 13B as print data to be used by a print engine.

Figure 9:
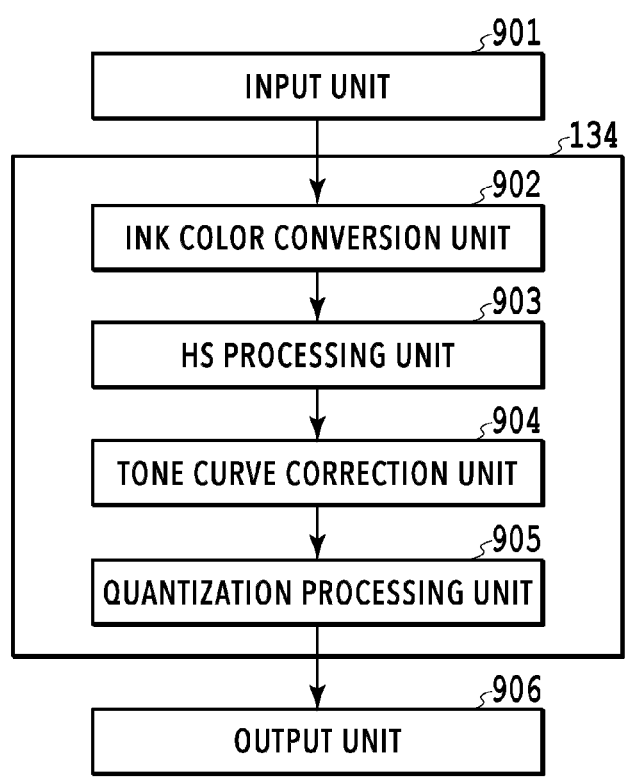
FIG. 9 is a flowchart describing processing by an image processing unit.

FIG. 9 is a flowchart describing the processing by the image processing unit 134. An input unit 901 receives the image data sent from the buffer 136 and passes the data to the image processing unit 134. This image processing unit 134 includes an ink color conversion unit 902, a head shading (HS) processing unit 903, a tone curve correction unit 904, and a quantization processing unit 905. RGB data is input into the input unit 901 from the higher-level device HC2. The input RGB data is pieces of 8-bit image data (R, G, B) in the color reproduction range of the printing apparatus 1A, and the resolution is 600 dpi.

The ink color conversion unit 902 converts the input pieces of 8-bit image data (R, G, B) into pieces of image data for the inks to be used by the printing apparatus 1A. The printing apparatus 1A in the present embodiment uses black (K), cyan (C), magenta (M), and yellow (Y) inks, and the pieces of image data formed of RGB signals are converted into pieces of image data formed of 8-bit color signals representing K, C, M, and Y. This color conversion is performed by a known method such as a matrix computation process or a process using a three-dimensional lookup table. In the present embodiment, a three-dimensional lookup table is used, and a conversion process is performed using this table and interpolation computation together. Also, the processing by the ink color conversion unit 902 may be executed before the RGB data is input into the input unit 901. In this case, the pieces of 8-bit KCMY image data are input into the input unit 901.

The HS processing unit 903 receives the 8-bit KCMY color signals, and performs a process of converting the piece of 8-bit data of each ink color into a piece of image data represented by an ink color signal matching characteristics such as the ejection volume of each nozzle forming the corresponding print head. This enables conversion into a piece of image data for performing uniform printing according to density unevenness resulting from the characteristics such as the ejection volume of each nozzle. In the present embodiment, the process is performed using a one-dimensional lookup table.

For each piece of image data after the HS process formed of an 8-bit ink color signal, i.e., for each ink color, the tone curve correction unit 904 adjusts the number of dots to be printed by an output unit 906. There is a case when the relation between the number of dots to be printed on the print medium and lightness is not linear. The tone curve correction unit 904 corrects each piece of 8-bit image data so as to make this relation linear to adjust the number of dots to be printed on the medium.

The quantization processing unit 905 performs a quantization process on the piece of 8-bit image data of each ink color processed by the tone curve correction unit 904 to obtain 1-bit binary data. Here, in the present embodiment, the quantization processing unit 905 firstly performs a conversion into pieces of index data being five 3-bit values of zero to four for each ink color. These pieces of index data zero to four correspond to patterns in which zero to four dots are arranged in 2×2 pixels at a resolution of 1200 dpi. The configuration of the quantization processing unit 905 is not limited to this example. For example, the quantization processing unit 905 may be configured to directly binarize each piece of 8-bit image data to determine whether or not to eject the ink. Also, the present embodiment uses dithering as the method of performing the quantization process, but a different quantization method, such as error diffusion, may be used.

Based on the dot data obtained by the quantization, the output unit 906 drives the print heads to eject the inks of the respective colors onto the print medium. As a result, printing is performed. Specifically, the output unit 906 is included in the printing system 1 illustrated in FIG. 1. The inspection unit 138 is an inspection processing unit that inspects the printed product P'.

Figure 10:
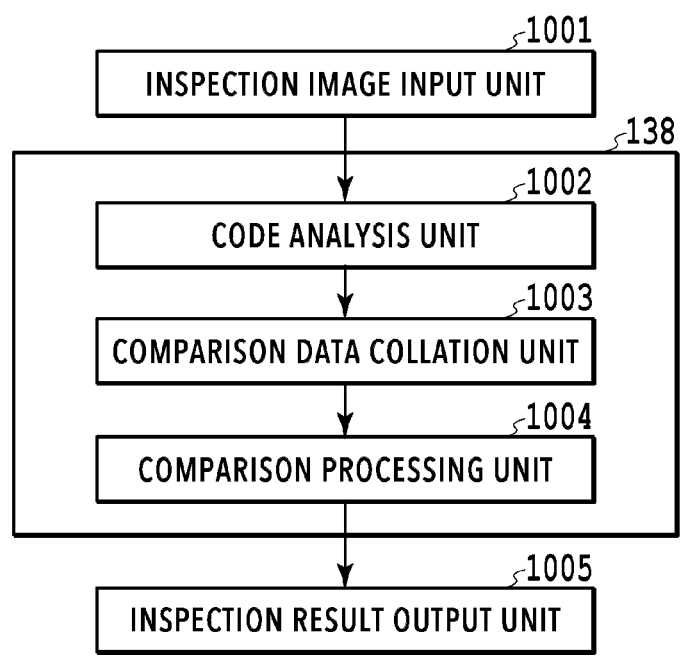
FIG. 10 is a flowchart describing processing by an inspection unit.

FIG. 10 is a flowchart describing processing by the inspection unit 138. An inspection image input unit 1001 inputs an image captured by the above-mentioned inspection unit 9A (here after "inspection image") into the inspection unit 138. The inspection image is an image captured of the printed product P' to be inspected. A code analysis unit 1002 obtains an inspection code region from the inspection image input thereinto and analyzes the code. The code region may be obtained using pattern matching, or the like, that is an existing technique. The code analysis is performed using a predetermined existing technique following the specification of the code. Then, information represented by a number, an alphabetical letter, or the like, embedded in the code is obtained. This information represents an identifier of the document data of the printed product P' to be inspected.

A comparison data collation unit 1003 obtains the document data of the printed product P' to be inspected by using the information obtained by the code analysis unit 1002. Then, after performing predetermined image processing on the inspection image and the document data, a comparison processing unit 1004 compares them and determines any region where a difference greater than or equal to a preset standard is detected, as a defect. Regarding the comparison method, for example, the difference between the signal values of corresponding pixels in the inspection image and the document data may be derived, or feature quantities including tonality, shape, and the like, may be calculated and the differences in the feature quantities between corresponding regions may be derived. Alternatively, instead of providing a preset standard, the inspection image and the document data may be input into a learning model having undergone machine learning in advance to determine whether there is a defect region. Note that the document data to be compared with the inspection image may be the data after the code was embedded or the data before the code was embedded.

An inspection result output unit 1005 displays the inspection result on the display screen of a monitor, or the like, not illustrated in order to notify the person operating the printing system 1 of the inspection result. Also, if necessary, the host device HC1, the storage unit 132, the engine controller 13B, and so on, are notified of the inspection result.

As illustrated in FIG. 5, the engine controller 13B includes control units 14 and 15A to 15E, and obtains detection results from and controls the driving of a sensor group and an actuator group 16 included in the printing system 1. These control units each includes a processor such as a CPU, a storage device such as a RAM or a ROM, and an interface for an external device. Note that the division of the control units is exemplary. The configuration may be such that a plurality of further subdivided control units execute part of control or, conversely, a plurality of control units are integrated and their control operations are performed by the single control unit.

The engine control unit 14 comprehensively controls the engine controller 13B. The print control unit 15A converts print data received from the main controller 13A into data of a data format suitable for driving the print heads 30, such as raster data. The print control unit 15A controls the ejection of each print head 30.

The transfer control unit 15B controls the application unit 5A, the absorption unit 5B, the heating unit 5C, and the cleaning unit 5D.

The reliability control unit 15C controls the supply unit 6, a recovery unit 12, and a driving mechanism that moves the printing unit 3 between an ejection position POS1 and a recovery position POS3. The conveyance control unit 15D controls the driving of the transfer unit 4 and controls the conveyance apparatus 1B. The inspection control unit 15E controls the inspection unit 9B and the inspection unit 9A. Of the sensor group and actuator group 16, the sensor group includes sensors that detect the positions and speeds of movable units, a sensor that detects temperature, image capturing elements, and so on. The actuator group includes motors, electromagnetic solenoids, solenoid valves, and so on.

Operation Example

Figure 6:
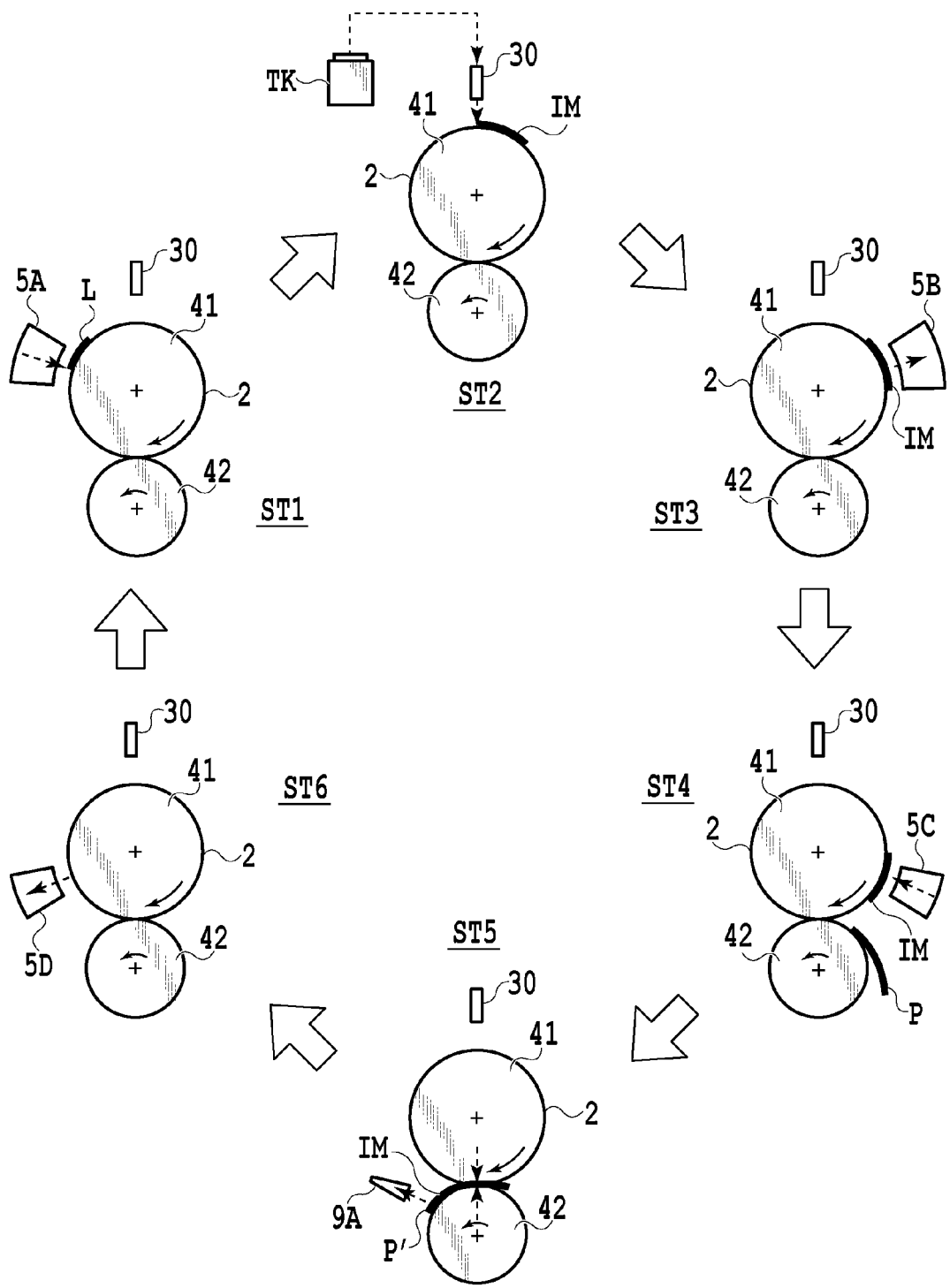
FIG. 6 is a diagram describing an example of operation of the printing system.

FIG. 6 is a diagram schematically illustrating an example of a printing operation. The following steps are cyclically performed while the transfer drum 41 and the impression cylinder 42 are rotated. As illustrated in a state ST1, first, a reaction liquid L is applied onto the transfer member 2 from the application unit 5A. The portion of the transfer member 2 on which the reaction liquid L is applied moves with the rotation of the transfer drum 41. When the portion on which the reaction liquid L is applied reaches a position under a print head 30, an ink is ejected from the print head 30 onto the transfer member 2, as illustrated in a state ST2. As a result, an ink image IM is formed. At this time, the ejected ink gets mixed with the reaction liquid L on the transfer member 2. This promotes the aggregation of the color material. The ink to be ejected is supplied to the print head 30 from the corresponding reservoir unit TK of the supply unit 6.

The ink image IM on the transfer member 2 moves with the rotation of the transfer member 2. The ink image IM reaches the absorption unit 5B, and the liquid components in the ink image IM are absorbed by the absorption unit 5B, as illustrated in a state ST3. The ink image IM reaches the heating unit 5C, and the ink image IM is heated by the heating unit 5C, so that the resin in the ink image IM melts and a film of the ink image IM is formed, as illustrated in a state ST4. In synchronization with such formation of the ink image IM, a print medium P is conveyed by the conveyance apparatus 1B.

As illustrated in a state ST5, the ink image IM and the print medium P reach the nip portion between the transfer member 2 and the impression cylinder 42, and the ink image IM is transferred onto the print medium P, so that a printed product P' is produced. After the printed product P' passes the nip portion, an image of the image printed on the printed product P' is captured by the inspection unit 9A, and the printed image is inspected. The printed product P' is conveyed to the collection unit 8*d* by the conveyance apparatus 1B.

The portion of the transfer member 2 on which the ink image IM was formed reaches the cleaning unit 5D, and is cleaned by the cleaning unit 5D, as illustrated in a state ST6. The end of the cleaning means the completion of one rotation of the transfer member 2. Then, the transfer of an ink image onto a print medium P is repeated through a similar procedure. In the above description, to facilitate understanding, an ink image IM is transferred once onto a single print medium P while the transfer member 2 makes one rotation. However, ink images IM can be consecutively transferred onto a plurality of print media P while the transfer member 2 makes one rotation.

Figure 7:
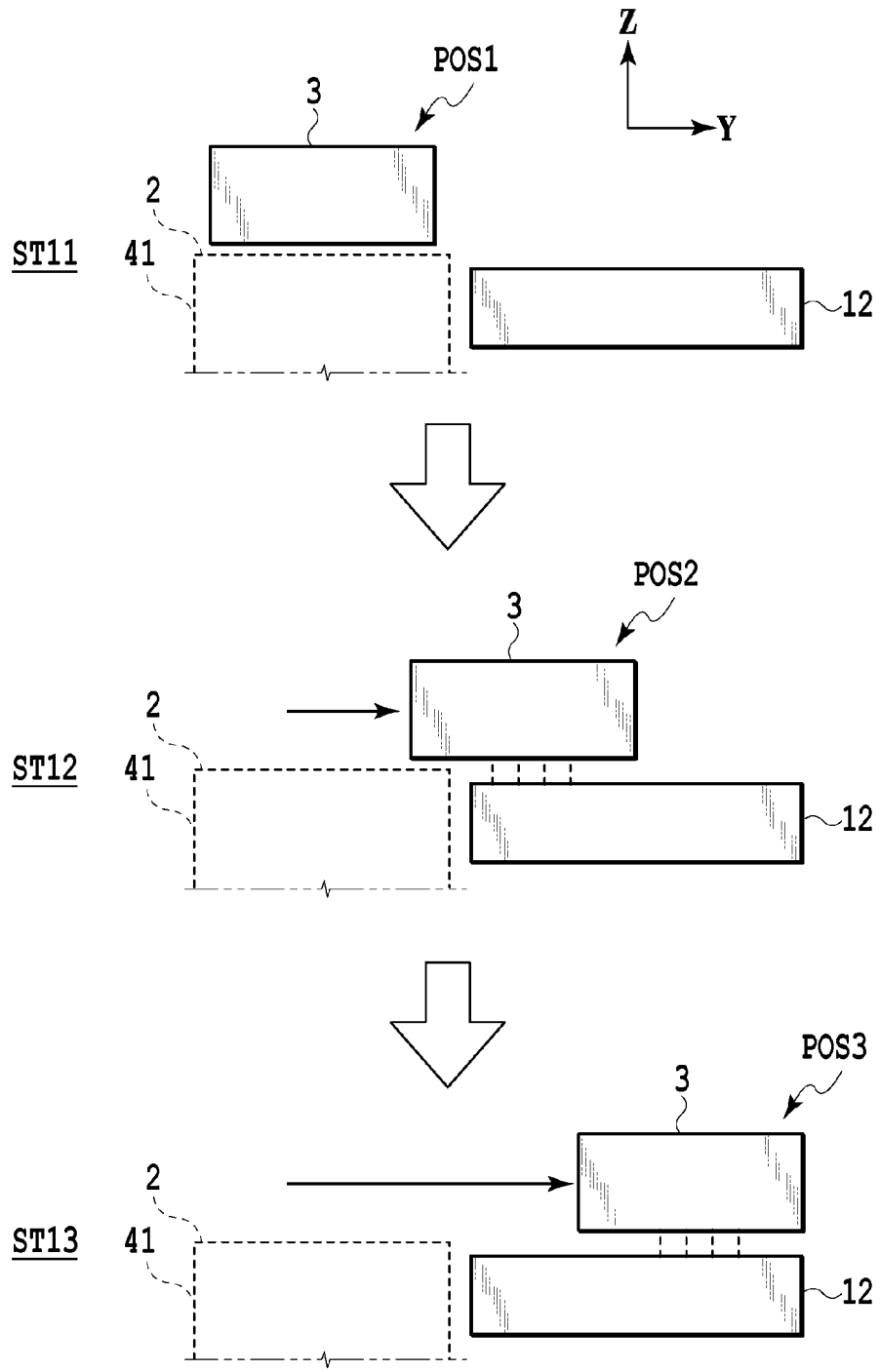
FIG. 7 is a diagram describing an example of operation of the printing system.

Maintenance of each print head 30 will be necessary as a printing operation as described above is repeated. FIG. 7 illustrates an example of operation during maintenance of each print head 30. A state ST11 illustrates a state where the printing unit 3 is located at the ejection position POS1. A state ST12 illustrates a state where the printing unit 3 is passing a preliminary recovery position POS2. During the passage, the recovery unit 12 executes a process of recovering the ejection performance of each print head 30 of the printing unit 3. Thereafter, as illustrated in the state ST13, with the printing unit 3 located at the recovery position POS3, the recovery unit 12 executes a process of recovering the ejection performance of each print head 30.

<Code Generation Process>

A system configuration of the host device HC1 in the present embodiment will be described using FIG. 4. The host device HC1 has a code generation unit 201, a print data generation unit 202, a candidate region determination unit 203, and a storage unit 204. The code generation unit 201 generates an inspection code. The print data generation unit 202 combines the code generated by the code generation unit 201 and image arrangement data representing a print region with an image(s) arranged therein. Specifically, the print data generation unit 202 embeds the code into the image arrangement data. The candidate region determination unit 203 determines the position to embed the inspection code. The storage unit 204 is a storage device, such as a RAM, a ROM, a hard disk drive, or an SSD, and stores programs to be executed by the CPU of the host device HC1 or data and provides a work area to the CPU.

Figure 11:
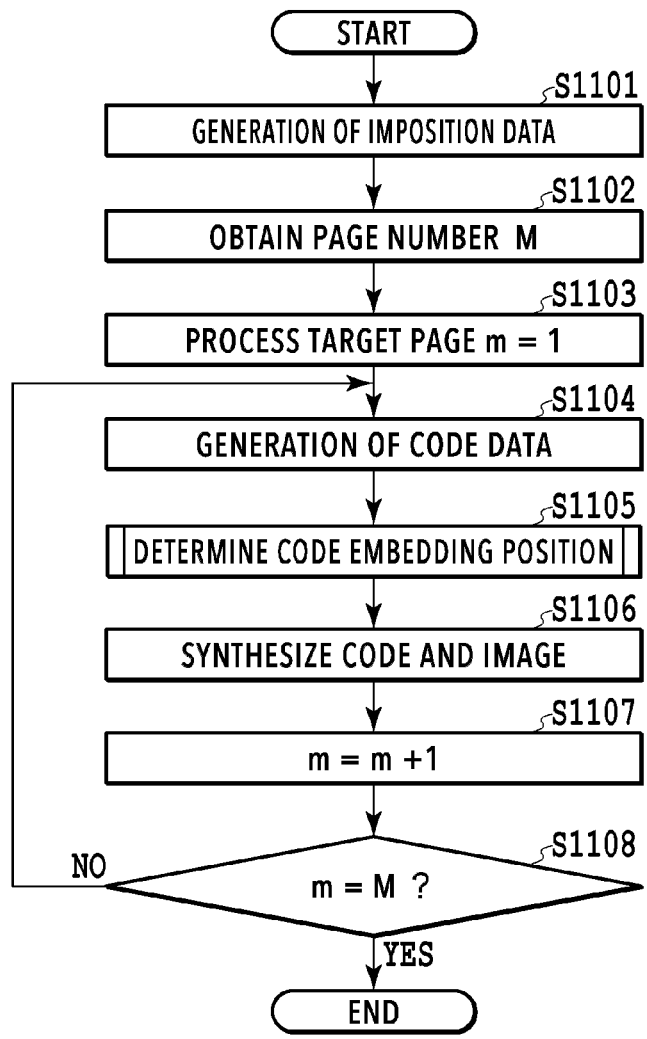
FIG. 11 is a flowchart of a process of generating document data.

FIG. 11 is a diagram describing a flow of a process of generating document data embedded with inspection codes performed in the host device HC1 in the present embodiment. This flow represents a process executed by the code generation unit 201, the print data generation unit 202, or the candidate region determination unit 203 included in the host device HC1. Specifically, the CPU of the host device HC1 implements the flow by loading a program stored in the ROM of the host device HC1 into its RAM and executing it. Meanwhile, the symbol "S" in the description of each process means a step in the flowchart. In response to starting the flow of the document data generation process, the host device HC1 generates imposition data of the images to be printed in S1101. The generation of imposition data will now be described.

Figure 12:
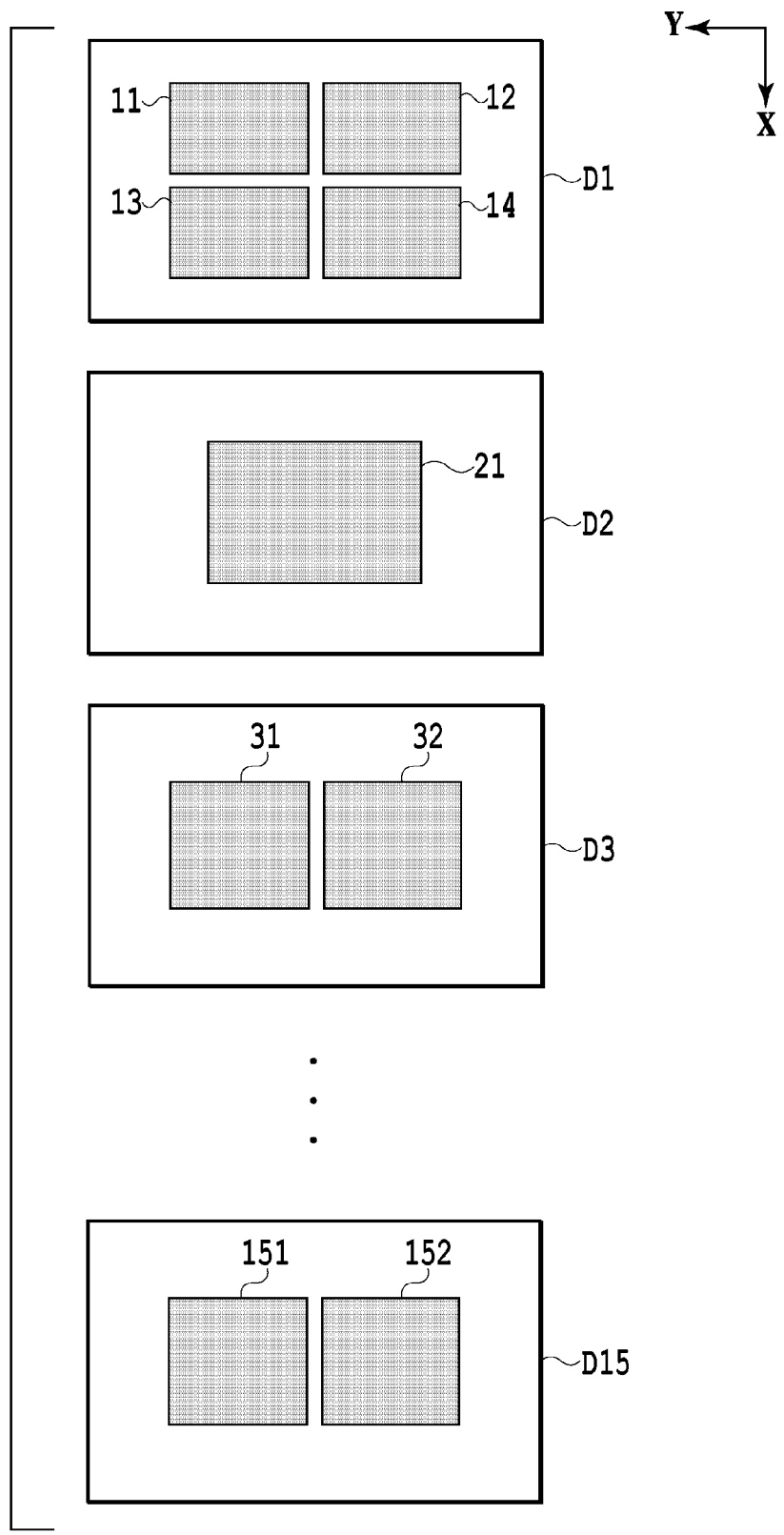
FIG. 12 illustrates an example of imposition data generated.

FIG. 12 illustrates an example of imposition data generated in the present embodiment. As illustrated in D1 to D15 in FIG. 12, a piece of image arrangement data refers to data representing a single page with one or more images arranged therein. A single inspection code is embedded in this single page represented by the piece of image arrangement data. The embedded code contains information on the document data to be compared in a quality inspection of the piece of image arrangement data. The piece of image arrangement data and the document data are associated with each other by the embedded code. In the present embodiment, in data D1 of the first page, four images 11, 12, 13, and 14 are arranged such that they have the same size and are aligned with each other. The images arranged in the single page may be the same or different. Note that the images 11, 12, 13, and 14 arranged in the first page are separated as four sections such that the respective parts of the piece of image arrangement data will remain before or after the comparison with the document data. For the other pages too, the images are separated such that only the image arrangement data parts will remain. In data D2 of the second page, only an image 21 is arranged at the center. In data D3 of the third page, images 31 and 32 are arranged. The last page is the 15th page. In data D15 of the 15th page, images 151 and 152 are arranged. Here, assume that the vertical and horizontal sizes of the pieces of data D1, D2, D3, . . . , and D15 are the sizes of the print media P stacked in the feeding unit 7.

The description now returns to FIG. 11. In S1102, the host device HC1 obtains a page number M of the imposition data. The present embodiment assumes that M=15, as illustrated in FIG. 12. In S1103, the host device HC1 sets the process target page to m=1, and starts a process of embedding an inspection code into the first page of the document.

In S1104, the host device HC1 generates data on the inspection code to be embedded in the data D1 on the first page. Base information for the code to be generated is an identification value of the first-page data D1. The identification value may be, for example, a name identifying the images themselves or the address in the storage unit 132 where the information is stored. In the case of a piece of image arrangement data representing a single page with a plurality of images arranged therein as mentioned above, a single identification value may be used as meta information for pieces of information on the images arranged. In the following, this means, for example, that while four images are arranged in D1, a single identification value is given to the data in the state where the four images are arranged.

Here, the number of digits for each page's identification value is desirably set by taking into account the number of pages represented by the imposition data generated in S1101. For example, in the present embodiment, the number M of pages represented by the imposition data is 15. Hence, at least 2-digit identification values should be ensured. It is, for example, preferable that the identification value of the first-page data D1 be "01". Alternatively, the maximum number of pages that may be included in a job to be sent to the printing apparatus may be ensured. For example, a 6-digit number "000001" may be used. In the present embodiment, "000001" is used as the identification value of the first-page data D1. Regarding the method of converting "000001", which is the identification value of the first-page data D1, into a code, NW-7 is used in the present embodiment. NW-7 is a representative code specification capable of converting numerical values and predetermined symbols into codes. The code specification is not limited to NW-7, and Interleaved Two of Five (ITF), CODE 39, CODE 128, or the like, may be used. Symbols and alphabetical letters usable besides numerical values and the number of digits are limited differently depending on the specification used. It is desirable to select a specification as appropriate according to the contents and the volume of information to be included in each code. Also, QR (Quick Response) Code (registered trademark), which is a two-dimensional code, may be selected instead of a one-dimensional code as listed above. In either case, it is preferable that the size of the code to be created satisfy a size recommended in the specification.

In S1105, the host device HC1 determines the code embedding position. Details of a method of determining the code embedding position will be described later using FIG. 13. In S1106, the host device HC1 synthesizes the image of the code generated in S1104 and the image of the data D1. Specifically, the host device HC1 embeds the generated code into m=first-page data D1. Here, the code embedding position is coordinates determined in S1105.

In S1107, the host device HC1 sets the process target page to m=m+1, and starts a process of embedding an inspection code into the second page. In S1108, the host device HC1 determines whether m as the process target page has reached the obtained number M of pages. Specifically, the host device HC1 checks whether the processing of the fifteen pages has been completed. At this point, the processing of the second page has started. Thus, the host device HC1 returns to S1104 and generates a code to be embedded into the second page. The code to be embedded into the second page is generated from the identification value of the second-page data D2 in FIG. 12, which is "000002". A process of embedding a code into a page in the document data is repeated in a similar manner until m=15.

The host device HC1 terminates the flow if determining in S1108 that m=M, that is, the processing has been completed for all of the obtained number of pages. By the processes up to this point, a single code can be embedded in each of the fifteen pages represented by the imposition data.

Figure 13:
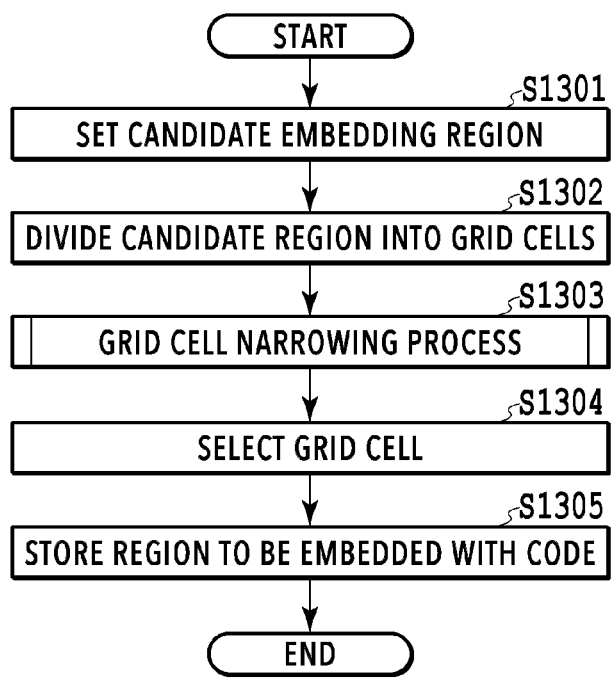
FIG. 13 is a flowchart of determination of a code embedding position.

FIG. 13 is a diagram describing a flow of the code embedding position determination in S1105. Specifically, a case of determining a position in the first-page data D1 in FIG. 12 will be described. The CPU of the host device HC1 implements this flow by loading a program stored in its program memory into its data memory and executing the program. Meanwhile, the symbol "S" in the description of each process means a step in the flowchart. In response to starting the code embedding position determination process, the device HC1 sets a candidate region R for the code embedding position in S1301. The candidate region refers to a candidate area in which to embed an identifier.

Figure 14A:
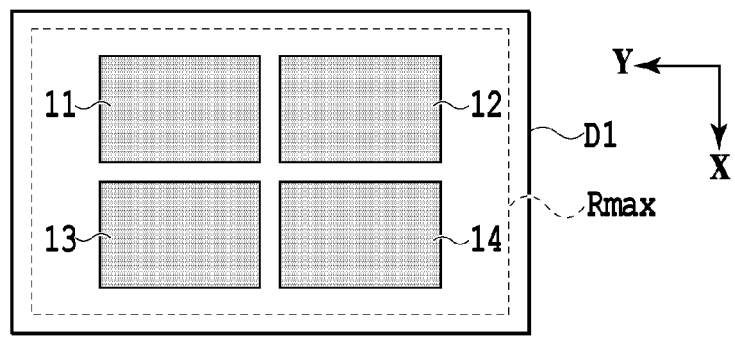
FIGS. 14A to 14D are diagrams describing steps in a flow of determining an embedding position in a first page.
Figure 14B:
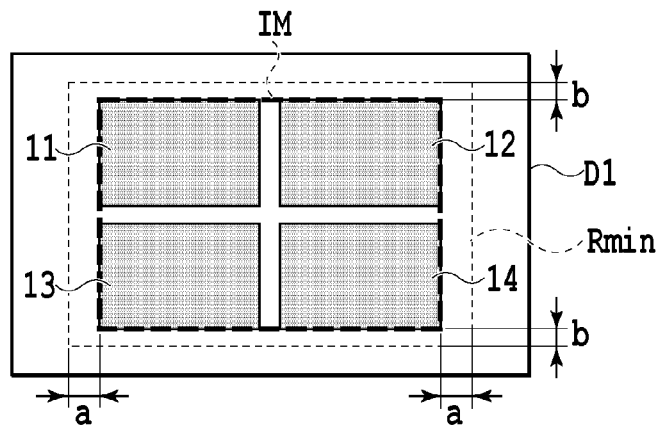

FIGS. 14A to 14D are diagrams describing the states of the candidate region in steps in the flow of the code embedding position determination in FIG. 13. FIGS. 14A to 14D are diagrams describing the candidate region in the data D1 in FIG. 12 taken as an example. FIG. 14A is an example of $R_{max}$ representing a case when the candidate region R has the maximum size. The maximum region $R_{max}$ as the candidate region R represents a printable region specific to the printing apparatus whose size is set at the outermost one within a size range smaller than the print medium P. In other words, the code cannot be embedded outside $R_{max}$. FIG. 14B is an example of $R_{min}$ representing a case where the candidate region R has the minimum size. The minimum region $R_{min}$ as the candidate region R represents a region that is the closest to an image placement region where the images are placed (here after referred to as "image region") within a range outside the image region. If the code overlaps the image region, it may cause an inspection error. For this reason, the code is embedded at a position separated from the image region by a certain distance. It is possible to embed the code near the image region or between a plurality of images arranged inside the image region, but the code and an image(s) may overlap due to deviation of the ejection timing, or the like. It is, therefore, not desirable to embed the code at any of these positions. An image region IM in the image arrangement data indicated by the dashed bold line is an image region in which the images 11, 12, 13, and 14 are seen as a single image. The minimum region $R_{min}$ as the candidate region R is set by shifting each end of the image region IM in the Y direction outwardly by a length a and shifting each end in the X direction outwardly by a length b. Assuming that the code generated in S1104 has a width of 20 mm in the Y direction and a width of 10 mm in the X direction, a region with a=20 mm and b=10 mm is the minimum region $R_{min}$ as the candidate region R. As described in FIGS. 14A and 14B, the candidate region R is desirably set to be outside $R_{min}$ and inside $R_{max}$. In the present embodiment, the candidate region R is set to be the region $R_{max}$.

Figure 14C:
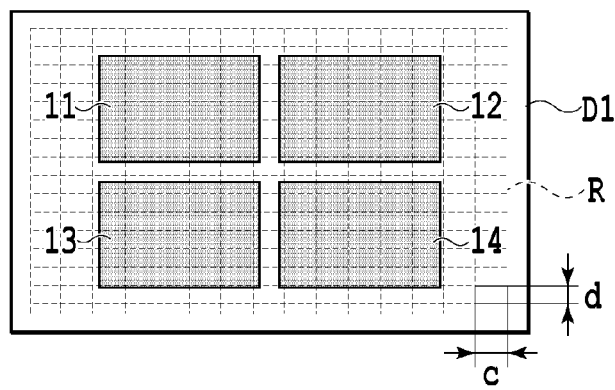

After the candidate region is determined in S1301, the host device HC1 proceeds to S1302, in which it divides the candidate region R into a grid pattern. FIG. 14C illustrates a state where the candidate region R is divided into a grid pattern. The size of each grid cell is desirably a size that is large enough to cover the size of the created code and is as small as possible in order to increase the number of candidate regions. The width of each grid cell in the Y direction is c, and the width in the X direction is d. It is desirable that the width c in the Y direction be set at a value larger than the width, in the Y direction, of the code generated in S1104, which is 20 mm, and the width d in the X direction be set at a value larger than the width of the code in the X direction, which is 10 mm. The code embedding position in each page is selected from among the above divided grid cells.

The code in each page embedded at the position of a selected grid cell will be printed without sticking out of the grid cell. Also, the code in each page can be printed at a position different from those of the others in both the X direction and the Y direction. Thus, the present embodiment is effective in both a case when some of the nozzles has a defect, which may occur in the Y direction, and a case when the intermediate transfer member is scratched or soiled, which may occur in the X direction. Even if a defect consecutively appears at a fixed position on print media P, printing a code at a different position in each page reduces the possibility of being affected by the defect at the fixed position. In the above, the candidate region R is divided into such a grid pattern that each grid cell is larger than the size of the code. However, the unit of division of the candidate region R is not limited to this case. For example, the candidate region R may be divided such that the width c of each divided unit grid cell in the nozzle array direction is larger than or equal to the size, in the Y direction, of the plurality of ejection substrates 301, 302, 303, and 304 of each print head 30 described in FIG. 8. The code in each page embedded at the position of a selected grid cell will not be printed with the same ejection substrate but will be printed with a different ejection substrate in a case when different grid cells in the Y direction are selected. Thus, even if an ejection trouble continuously occurs at a fixed position on an ejection substrate, this reduces the impact of the trouble of the ejection substrate occurring at the fixed position on the code printed in each page. Next, in S1303, the host device HC1 performs a narrowing process for determining the code embedding position from among the divided grid cells.

Figure 15:
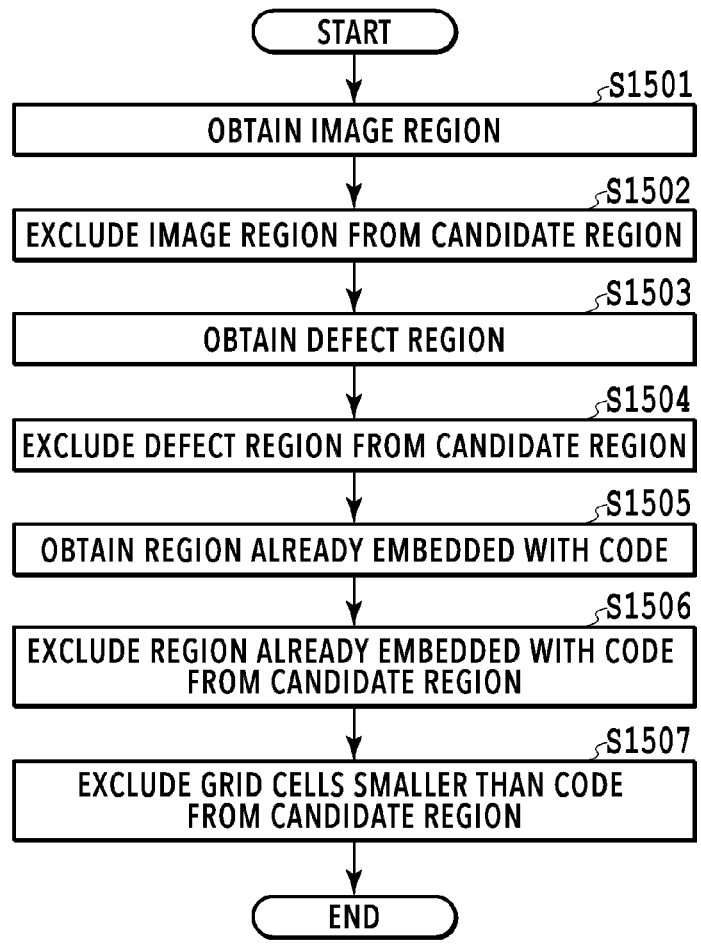
FIG. 15 is a flowchart of a process of narrowing down grid cells.

FIG. 15 is a detailed flowchart of the process in S1303 in FIG. 13. In response to starting the grid cell narrowing process, the host device HC1 obtains the image region in S1501. The range of the image region varies by page. Here, position information of the images 11, 12, 13, and 14 illustrated in FIG. 14C is obtained. For example, there is a method in which, for each of the images 11, 12, 13, and 14, the coordinates of the upper left corner (X1, Y1) and the coordinates of the lower right corner (X2, Y2) are obtained, and the rectangular region of the image is determined based on the coordinates.

Figure 14D:
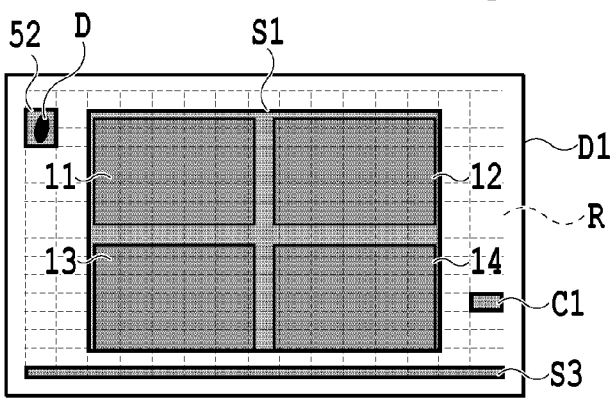

In S1502, the host device HC1 excludes grid cells including the image regions from the candidate region R. A region S1 indicated by a bold frame in FIG. 14D is a collection of grid cells including at least part of the region of any of the images 11, 12, 13, and 14 among the grid cells in the candidate region R. If a code is embedded in a grid cell in this region S1, an image(s) and the code will overlap. As described above, in the present embodiment, an overlap between an image and a code can be a cause of an error during an inspection. It is, therefore, desirable to exclude the region S1 from the candidate region R.

In S1503, the host device HC1 obtains a defect region from the inspection unit 138. An example of a method of obtaining a defect region will now be discussed. The grid cells divided in S1302 are given respective grid cell IDs with which they can be distinguished from one another. A printing defect detected by the inspection unit 138 is accumulated in the storage unit 132 for each printed product P'. Also, in a case when the inspection unit 138 continuously detects defects with the same grid cell ID from printed products P', the defects are determined to be positionally dependent. In the present embodiment, as illustrated in FIG. 14D, a region S2 including a defect D continuously appearing in an upper left section is stored as grid cell IDs. Note that, while a defect region is obtained from the inspection unit 138, the obtaining is not limited to this manner. The obtaining may be done by using information from a sensor, or the like, that detects ejection abnormality of any print head.

In S1504, the host device HC1 excludes the region S2 from the candidate region R. If a code is embedded into a grid cell in this region S2, the defect D and the code will overlap. It is, therefore, desirable to exclude the region S2 from the candidate region R. In S1505, the host device HC1 obtains the region in the other page(s) already embedded with a code or its grid cell ID. Here, m=1, that is, the first page is being processed, and thus there is no region already embedded with a code. A description is, therefore, omitted. S1505 and S1506 will be described later through an example of processing of the second and subsequent pages.

In S1507, the host device HC1 excludes grid cells smaller than the size of a code from the candidate region R. In S1302, the grid cells are basically divided to be larger than the size of a code. There is, however, a case when the candidate region R cannot be divided exactly by the size of a code and there are grid cells with a size smaller than a code. A region S3 indicated by a bold frame in FIG. 14D is a collection of grid cells with a shorter length in the Y direction than a code. Thus, the region S3 is excluded from the candidate region R. By this point, the regions S1, S2, and S3 have been excluded from the candidate region R, and the candidate region R is updated to the collection of remaining grid cells. In response to completion of S1507, the host device HC1 terminates the grid cell narrowing process.

The description now returns to FIG. 13. In S1304, the host device HC1 selects one grid cell from the candidate region R narrowed down in S1303. The selection method is not particularly limited. For example, the grid cells in the candidate region R may be numbered, and the grid cell with a randomly selected number may be selected. A region C1 indicated by a bold frame in FIG. 14D is illustrated as the grid cell selected here and represents a region to embed a code in the first-page data D1.

In S1305, coordinates of the region C1 are stored. The coordinates of the upper left corner of the region C1 (X1, Y1) and the coordinates of the lower right corner (X2, Y2) are stored to save the rectangular region of the image. In response to completion of the process in S1305, the host device HC1 terminates the process of determining the code embedding position.

Next, details of the process in S1105 in the flow in FIG. 11 for m=2, i.e., the second page, will be described. The following description will be basically given on the assumption that the processes in FIGS. 13 and 15 are performed similarly to the processes for m=the first page. Note that a description will be omitted as appropriate for parts involving performing similar processes to those for the first page.

Figure 16A:
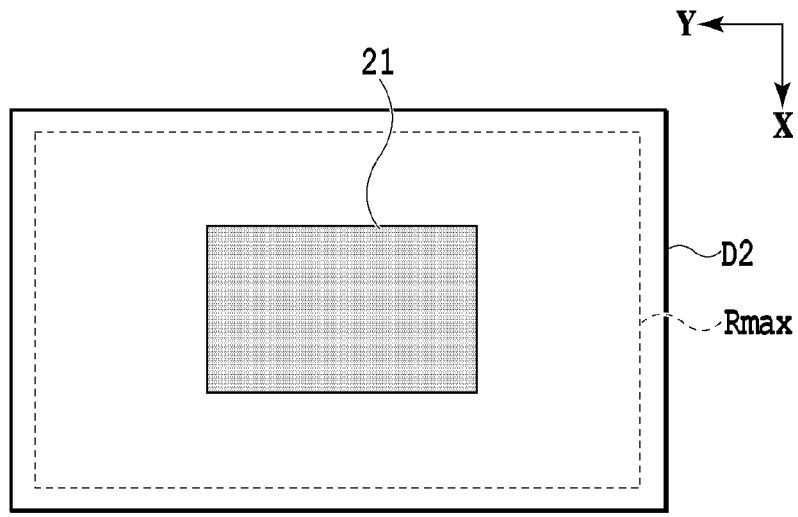
FIGS. 16A to 16C are diagrams describing steps in a flow of determining an embedding position in a second page.
Figure 16B:
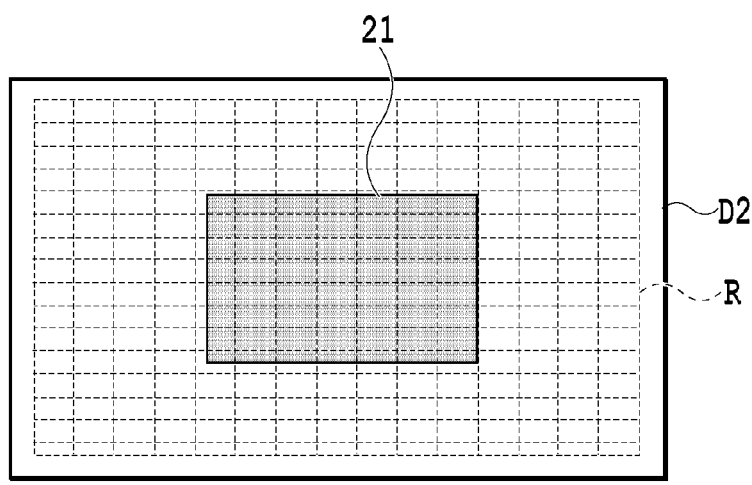
Figure 16C:
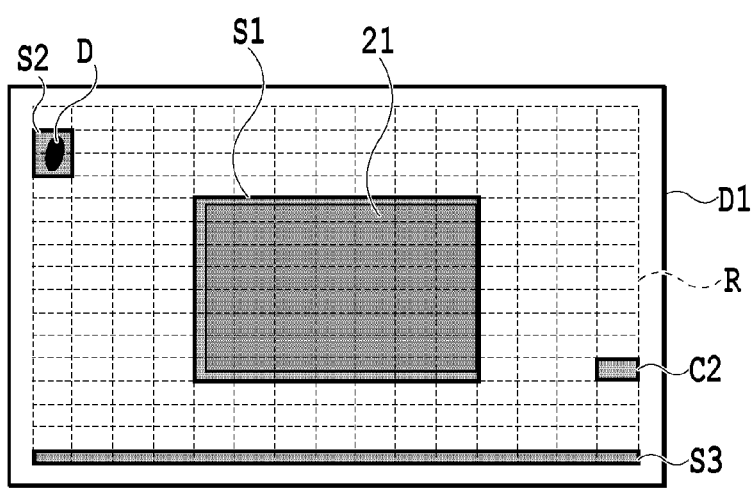

FIGS. 16A to 16C are diagrams describing the states of the candidate region in steps in the flow of the code embedding position determination in FIG. 13. A case of determining a position in the second-page data D2 in FIG. 12 will be described. In S1301, the host device HC1 sets a candidate region R for the code embedding position. FIG. 16A illustrates the candidate region R set in the second page. As with the first page, the printable region $R_{max}$ specific to the printing apparatus is set as the candidate region R. In S1302, the host device HC1 divides the candidate region R into a grid pattern. FIG. 16B illustrates a state where the candidate region R in the second page is divided. The size of the code to be embedded is the same as that in the first page, and the size of division of the candidate region R is the same as that in the first page.

In S1303, the host device HC1 performs a process of narrowing down the divided grid cells. FIG. 16C is a diagram describing regions excluded by performing the narrowing process in FIG. 15 similarly to that for the first page. The regions excluded are a collection S1 of grid cells including an image region 21, a collection S2 of grid cells including the defect region D, and a collection S3 of grid cells each having a smaller size than a code. Furthermore, in S1506, a region C2 is excluded from the candidate region R. The region C2 is the region C1 in the first page, in which its code was embedded. By this point, the regions S1, S2, S3, and C2 have been excluded from the candidate region R in the second page, and the candidate region R is updated to a region with the remaining white grid cells, as illustrated in FIG. 16C. By repeating the above processes for the number M of pages, data is generated such that the codes embedded in the pages will be printed at different positions.

Figure 22:
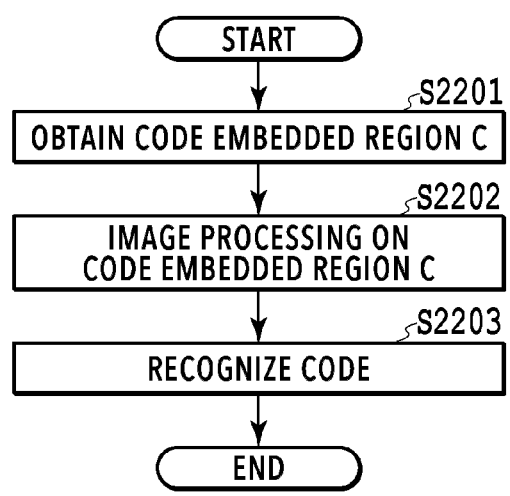
FIG. 22 is a flowchart of an analysis performed by a code analysis unit.

Next, the analysis of a printed code by the code analysis unit 1002 will be described. FIG. 22 illustrates a flow of the analysis performed by the code analysis unit 1002. Meanwhile, the symbol "S" in the description of each process means a step in the flowchart.

In response to starting the code analysis, the code analysis unit 1002 obtains the coordinates of a code embedding region C in S2201. The coordinates may be sent to the storage unit 132 in response to the determination of the code embedding region C in S1304 and obtained from the storage unit 132 at the time of the code analysis. Alternatively, existing pattern matching may be used to obtain the coordinates of the region C.

In S2202, the code analysis unit 1002 executes image processing on the code embedding region C. Here, the code analysis unit 1002 narrows down the image processing target to the code embedding region C from the entire inspection image input by the inspection image input unit 1001, and executes the image processing on the code embedding region C. At this time, other image processing may or may not be executed on the entire region of the inspection image excluding the code embedding region C. In either case, image processing suitable for code recognition is executed on the code embedding region C. Examples of the image processing suitable for code recognition will be described below.

The composition ratio of each channel's reading value (R, G, B) may be varied according to the ink color or the printing density of the code. Alternatively, only a particular channel may be used according to the ink color to obtain a single-channel image. In the case of using only a particular channel according to the ink color, it is preferable to use a channel with a wavelength that the ink color can absorb. For example, a region printed with the cyan ink absorbs a red wavelength region (approximately 600 nm). Thus, with the R channel, the region is imaged to be dark. On the other hand, a region not printed with the cyan ink reflects the red wavelength region (approximately 600 nm). Thus, with the R channel, the region is imaged to be white. In this way, high contrast can be obtained between a region printed with the cyan ink and a region not printed with the cyan ink.

Similarly, the G channel may be used for a region printed with the magenta ink, and the B channel may be used for a region printed with the yellow ink. In this way, high contrast can be obtained. Also, a threshold value may be provided and the signal values may be converted into binary black-and-white images based on the threshold value, or a pixel value conversion table having hysteresis characteristics may be used to improve contrast. Another existing contrast improving technique may be used. Alternatively, the above techniques may be executed in combination. In FIG. 22, image processing is performed on the code embedding region C in the inspection image input from the inspection image input unit 1001. Alternatively, the inspection unit 9A may perform thresholding as described above or conversion with hysteresis characteristics and then output a high-contrast image.

In S2203, the code analysis unit 1002 analyzes the code. The code analysis is performed using a predetermined existing technique following the code's specification. Then, the information represented by the number, the alphabet letter, or the like, embedded in the code is obtained. In response to completing the process in S2203, the code analysis unit 1002 terminates this flow. By the analysis in this flow, the comparison target document data corresponding to the inspection image is now known, and a comparative inspection is performed on the inspection image and the document data.

As described above, according to the present embodiment, it is possible to reduce the possibility of overlap between a defect portion and a code. Specifically, in the present embodiment, in which each print head 30 is a full-line head, even if a defect appears at a fixed position due to trouble with a nozzle, the possibility of the defect continuing to overlap codes is reduced. This increases the possibility of succeeding in executing the normal inspection. Also, one may consider a method in which each page is embedded with a plurality of codes representing the same information so that, if one code overlaps a defect at a fixed position, another code can be read. With this method, however, printing the codes requires a larger area in the image data and on the print medium. Considering a case when the margin is small or a case when the codes cannot be printed over an image, the present embodiment is superior to this method.

Embodiment 2

In Embodiment 1, a method in which each page in document data is embedded with an inspection code at a different position has been described. However, the code embedding position does not have to be different for every page. The reason is as follows, for example. As mentioned in the description of the transfer unit, the transfer member 2 is provided on the outer peripheral surface of the transfer drum 41. While the transfer drum 41 makes one rotation, a given number of pages of document data that can be transferred onto a plurality of print media P are formed on the transfer member 2 as ink images IM. For example, while the transfer drum 41 makes one rotation, ink images IM of four pages of document data corresponding to four print media P are formed on the transfer member 2. In this case, if a region on the transfer member 2 has trouble such as being scratched or having foreign substances attached to the region, an image defect regularly appears at the same region on every four printed products P'. Specifically, if trouble that has occurred on a region on the transfer member 2 appears as an image defect on the 1st printed product P', the image defect will appear at the same region on the 5th, 9th, 13th, . . . printed products P'. The trouble on the transfer member 2 does not affect the 2nd to 4th, 6th to 8th, 10th to 12th, . . . printed products P'. In the present embodiment, a description will be given of a method of determining the code embedding position in each page with such a case taken into account.

Figure 17:
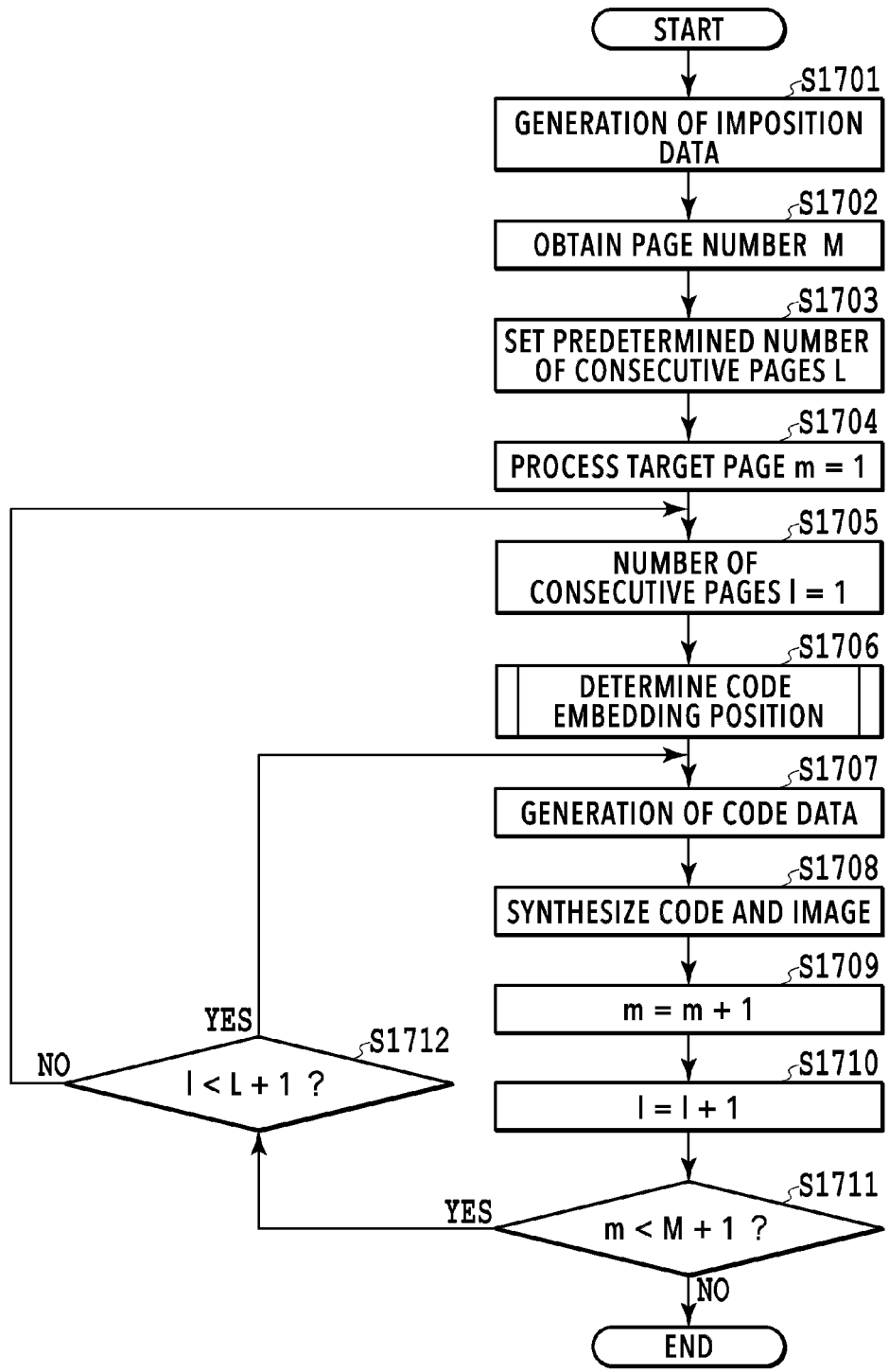
FIG. 17 is a flowchart of a process of generating document data.

FIG. 17 is a diagram describing a flow of a process of generating document data performed in the host device HC1 in the present embodiment. The CPU of the host device HC1 implements this flow by loading a program stored in its program memory into its data memory and executing the program. Meanwhile, the symbol "S" in the description of each process means a step in the flowchart.

In response to starting the flow of the document data generation process, the host device HC1 generates imposition data of the images to be printed in S1701.

Figure 18:
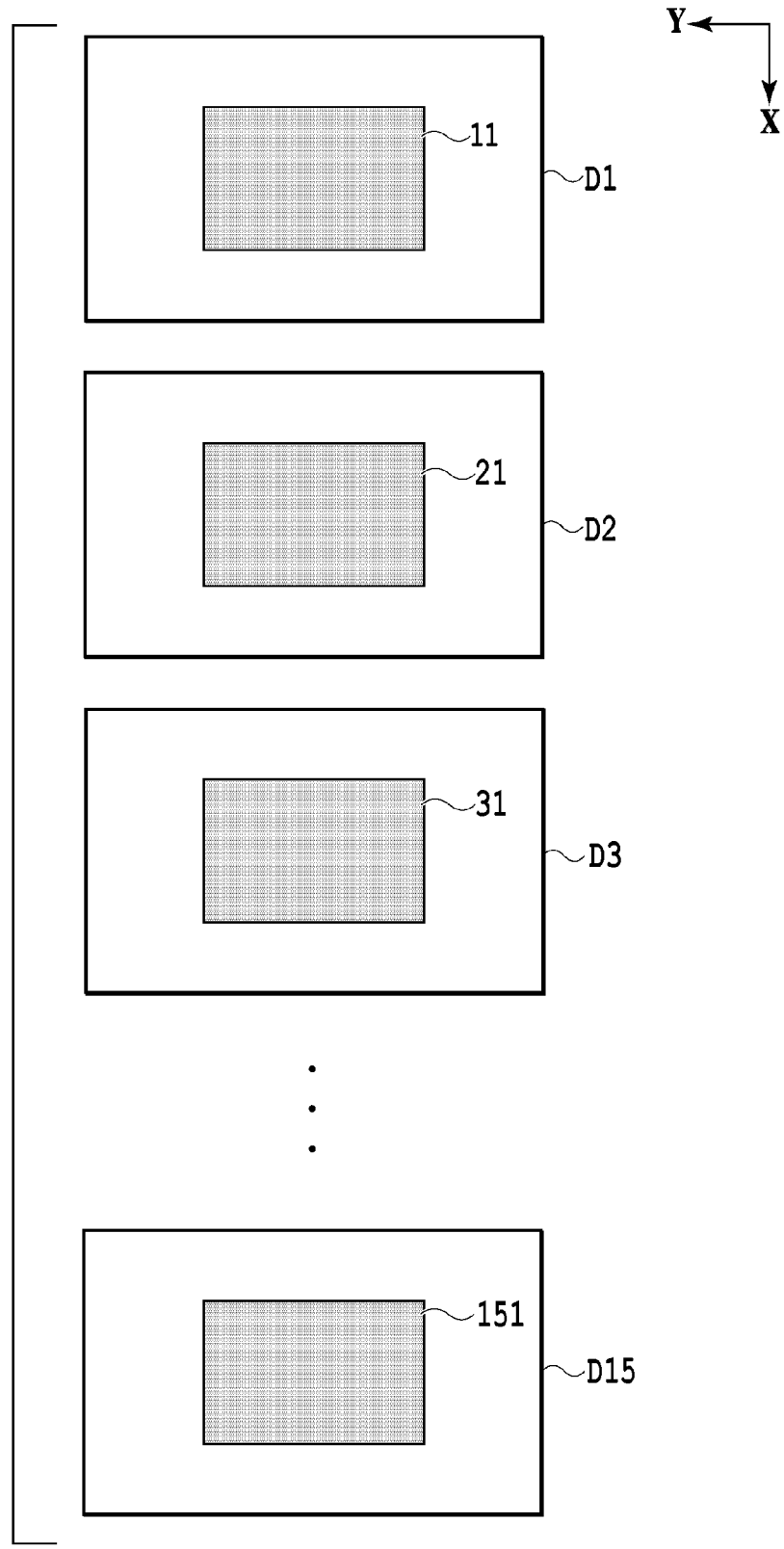
FIG. 18 illustrates an example of imposition data generated.

FIG. 18 illustrates an example of imposition data generated in the present embodiment. In data D1 of the first page, only an image 11 is arranged at the center. Images 21 and 31 are arranged at the same region in the second and third pages, respectively. All images are arranged with the same layout up to the 15th page, which is the last page. The present embodiment is applicable to printed products P' given the same image layout for all pages or at predetermined intervals of pages. Also, even in a case when all pages have different image layouts, the present embodiment is applicable as long as each page has a common non-image region. Here, assume that the vertical and horizontal sizes of the pieces of data D1, D2, D3, . . . , and D15 are the sizes of the print media P stacked in the feeding unit 7. In S1702, the host device HC1 obtains a page number M of the imposition data. The present embodiment assumes that M=15, as illustrated in FIG. 18.

In S1703, the host device HC1 sets a predetermined number L of consecutive pages. This is the number of consecutive pages to be embedded with codes at the same position, and is set to be the number of printed products P' to be obtained by transfer performed per rotation of the transfer drum 41. In the present embodiment, L=4 is set on the assumption that four printed products P' are printed per rotation of the transfer drum 41, as mentioned above.

In S1704, the host device HC1 sets the process target page to m=1, and starts a process of embedding an inspection code into the first-page data D1. In S1705, a number l of consecutive pages to be embedded with codes at the same position is set at 1 (l=1), and the process is started. In S1706, the host device HC1 determines the code embedding position. Regarding the method of determining the code embedding position, the flows in FIGS. 13 and 15 described in Embodiment 1 may be used to determine the code embedding position.

In S1707, the host device HC1 generates an inspection code to be embedded into the first page. Base information for the code to be generated is an identification value of the first-page data D1. As with the method described in Embodiment 1, the code is generated from a single identification value for the data in which an image is arranged. In the present embodiment too, "000001" is used as the identification value of the first-page data D1. Regarding the method of converting "000001", which is the identification value of the first-page data D1, into a code, NW-7, which has been described in Embodiment 1, is used. It is desirable that the size of the code to be generated be also a size recommended in the specification, as with Embodiment 1.

In S1708, the host device HC1 embeds the code generated in S1707 into m=first-page data D1. Here, the code embedding position is the coordinates determined in S1706.

In S1709, the host device HC1 sets m to m+1 (m=m+1), and starts a process of embedding an inspection code into the second page. In S1710, the host device HC1 sets l to l+1 (l=l+1) to increment the number of consecutive pages to be embedded with codes at the same position and shift to the second page. In S1711, the host device HC1 determines whether the processing of the fifteen pages, which are equal to the obtained number of pages, has been completed. At this point, the processing of the second page has started. Thus, the host device HC1 determines that the processing of the fifteen pages has not been completed, and proceeds to S1712.

In S1712, the host device HC1 determines whether the processing of the four pages, which are equal to the set number of consecutive pages, has been completed. At this point, the processing of the second page has started. Thus, the host device HC1 determines that the processing of the four pages has not been completed, and returns to S1707 and generates a code to be embedded into the second page. The code to be embedded into the second page is generated from the identification value of the second-page data D2 in FIG. 12, which is "000002". Then, in S1708, the host device HC1 embeds the code generated in S1707 into m=second-page data D2. Here, the code embedding position is the same coordinates as those for m=1st page determined in S1706. Codes are synthesized at the same region in this manner consecutively up to L=4 pages, which has been set in advance. In response to reaching m=4, that is, in response to completing the processing up to the fourth page, the number of consecutive pages is reset to l=1 in S1705. In response to reaching m=5, the host device HC1 determines a new embedding position to be used for the fifth to eight pages in S1706. A process of embedding a code into a page in the document data is repeated in a similar manner until m=15.

In S1711, the host device HC1 determines that the processing has been completed for all of the obtained number of pages, and terminates this flow. By the processes up to this point, a single code can be embedded in each of the fifteen pages represented by the imposition data.

By executing the above processes, every predetermined number L of consecutive pages is embedded with codes at the same position. In the present embodiment, L=4 is set. Thus, the first to fourth printed products P' are embedded with codes at the same position. The embedding position changes from the fifth printed product P', and the fifth to eighth printed products P' are embedded with codes at the same position. In a case when trouble occurring at a region on the transfer member 2 affects the 1st, 5th, 9th, and 13th printed products P', the possibility of the defect continuing to overlap their codes is reduced. This increases the possibility of succeeding in executing the normal inspection.

Embodiment 3

In Embodiment 1, a method in which each page in document data is embedded with an inspection code at a different position has been described. In Embodiment 2, a method in which each predetermined number of pages in document data is embedded with inspection codes at a different position. In the present embodiment, a case of repeating embedding a code at the same position in each of pages appearing at predetermined intervals will be described. For example, the present embodiment is effective in a case when the range of the candidate region R to embed a code is small or other similar cases.

Figure 19:
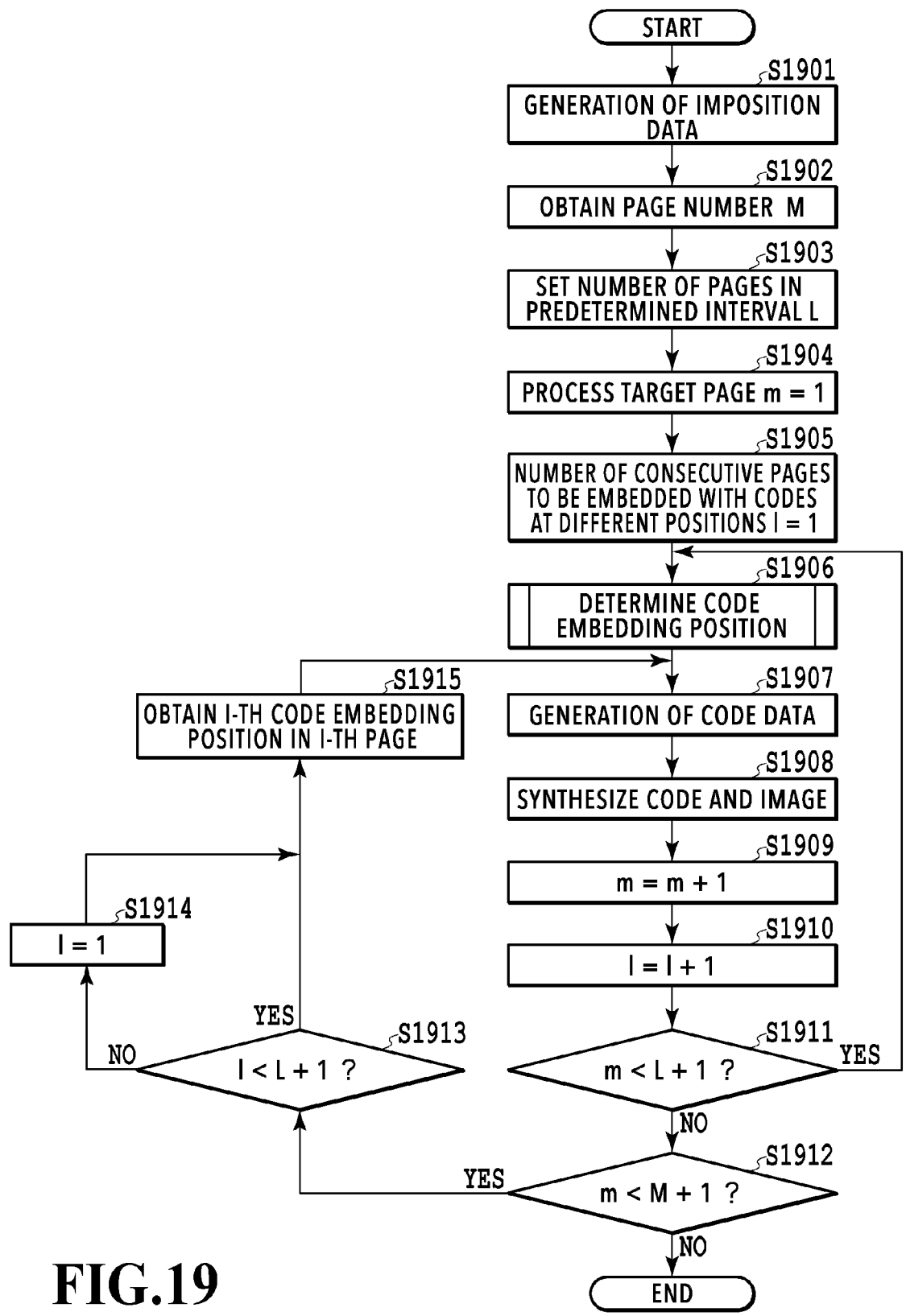
FIG. 19 is a flowchart of a process of generating document data.

FIG. 19 is a diagram describing a flow of a process of generating document data performed in the host device HC1 in the present embodiment. The CPU of the host device HC1 implements this flow by loading a program stored in its program memory into its data memory and executing it. Meanwhile, the symbol "S" in the description of each process means a step in the flowchart. In response to starting the flow of the document data generation process, the host device HC1 generates imposition data of the images to be printed in S1901.

Figure 20:
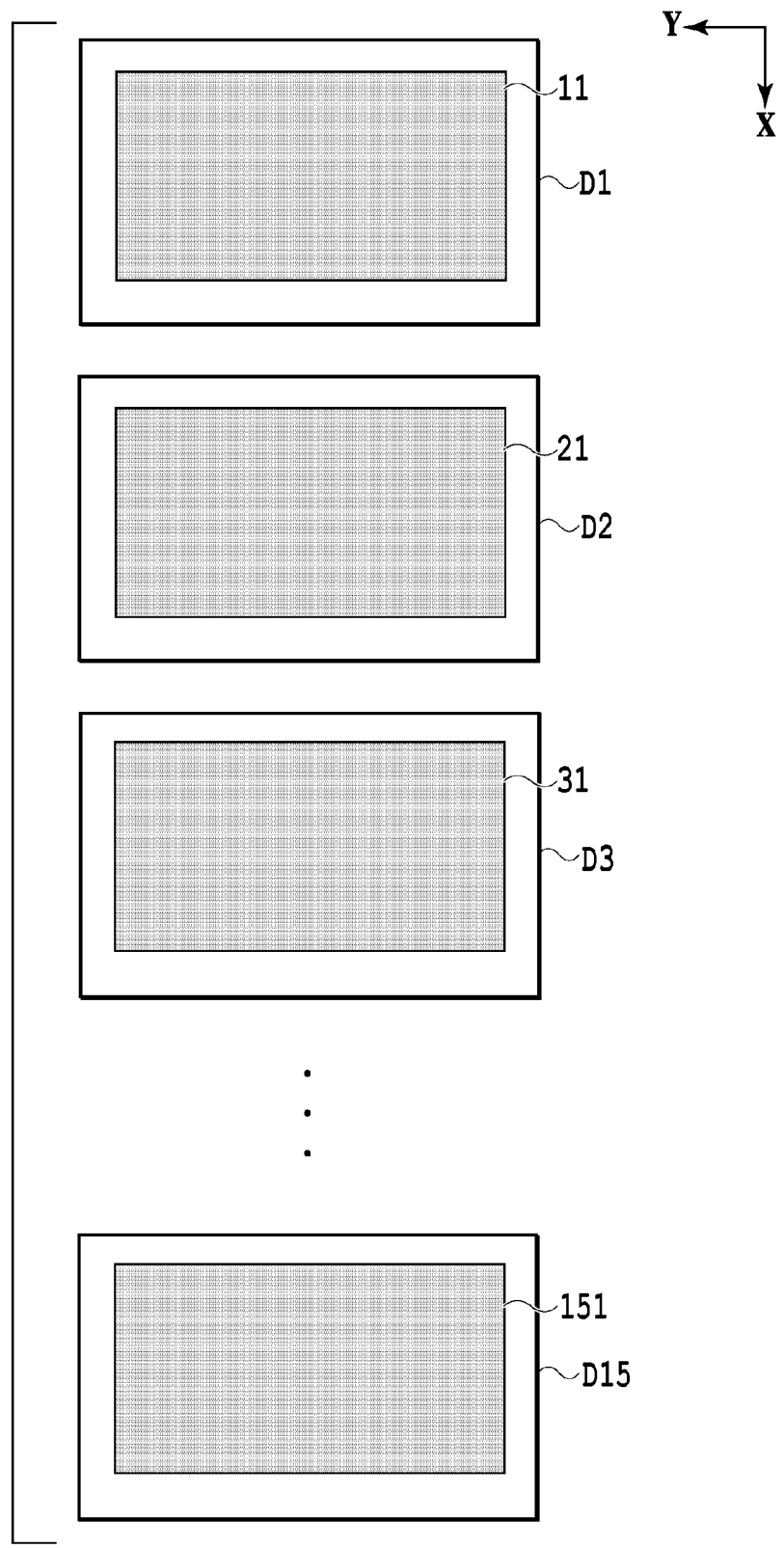
FIG. 20 illustrates an example of imposition data generated.

FIG. 20 illustrates an example of imposition data generated in the present embodiment. In data D1 of the first page, only an image 11 is arranged. The size of the image 11 is slightly smaller than the printable region on the print medium P. Images 21 and 31 are arranged at the same region in the second and third pages, respectively. All images are arranged in the same manner up to the 15th page, which is the last page. Here, assume that the vertical and horizontal sizes of the pieces of data D1, D2, D3, . . . , and D15 are the sizes of the print media P stacked in the feeding unit 7.

In S1902, the host device HC1 obtains a page number M of the imposition data. The present embodiment assumes that M=15, as illustrated in FIG. 20. In S1903, the host device HC1 sets a number L of pages in a predetermined interval. This is the number of consecutive pages to be embedded with codes at different positions. The number L indicates that codes are to be embedded at different positions in the first to L-th pages and, for the (L+1)-th and subsequent pages, the embedding position returns to that in the first page and codes are embedded from that position again. In the present embodiment, L=7 is set. A method of setting this will be described later.

In S1904, the host device HC1 sets the process target page to m=1, and starts a process of embedding an inspection code into the first-page data D1. In S1905, the host device HC1 sets a number l of consecutive pages to be embedded with codes at different positions to 1 (l=1), and starts the process. In S1906, the host device HC1 determines the code embedding position. A method of determining the code embedding position will be described in detail later.

In S1907, the host device HC1 generates a code by using a method similar to those in Embodiments 1 and 2. In S1908, the host device HC1 embeds the code generated in S1907 into m=1, i.e., the first-page data D1. Here, the code embedding position is coordinates determined in S1906. In S1909, the host device HC1 sets m to m+1 (m=m+1), and starts a process of embedding an inspection code into the second page. In S1910, the host device HC1 sets l to l+1 (l=l+1) to increment the number of consecutive pages to be embedded with codes at different pages and to shift to the second page.

While m<L+1 in S1911, the host device HC1 repeats S1906 to S1910 to continue the process of embedding a code into a new position. In the present embodiment, the number of pages in a predetermined interval is L=7, and, therefore, codes are embedded at different positions up to the seventh page. In response to reaching the eighth page, the host device HC1 proceeds to S1912.

In S1912, the host device HC1 determines whether the processing of the fifteen pages, which are equal to the obtained number of pages, has been completed. At this point, the processing has been completed up to the eighth page but not for the fifteen pages, and the host device HC1, therefore, proceeds to S1913. In S1913, the host device HC1 determines whether the number of consecutive pages to be embedded with codes at different positions has exceeded the number L of pages in a predetermined interval. At this point, l=8, and the host device HC1 determines that the number of consecutive pages to be embedded with codes at different positions has exceeded the number of pages in a predetermined interval, which is L=7, and proceeds to S1914. In S1914, the host device HC1 resets the number of consecutive pages to be embedded with codes at different positions to l=1.

In S1915, the host device HC1 obtains the code embedding position for l=1 stored in S1906. In S1907, the host device HC1 generates a code for m=8, i.e., the eighth page. In S1908, the host device HC1 embeds the code generated in S1907 into the eighth-page data D8. Since the value of l has been reset in S1914, the embedding position is the same coordinates as those for l=1, i.e., the first page. In S1909, the host device HC1 sets m to m+1 (m=m+1), and starts a process of embedding an inspection code into the ninth page. In S1910, the host device HC1 sets l to l+1 (l=l+1) to increment the number of consecutive pages to be embedded with codes at different positions and to shift to the second page. In S1911, m=9, that is, the number of pages processed is greater than the number of pages in a predetermined interval, which is L=7, and the host device HC1 therefore proceeds to S1912. In S1912, m=9, that is, the number of pages processed has not reached the number of pages M=15, and the host device HC1 therefore proceeds to S1913. In S1913, l=2, that is, the number of consecutive pages to be embedded with codes at different positions is less than the number of pages in a predetermined interval, and the host device HC1 therefore proceeds to S1915. In S1915, the host device HC1 obtains the code embedding position for l=2 stored in S1906. For the 8th to 14th pages, the host device HC1 obtains the code embedding positions in the 1st to 7th pages in S1915, and similarly embeds codes at these positions. Specifically, codes are embedded by following a pattern in which a code is embedded in the eighth page at the same position as that in the first page, a code is embedded in the ninth page at the same position as that in the second page, and so on. A process of embedding a code into a page in the document data is repeated in a similar manner until m=15. In S1912, the host device HC1 determines that the processing has been completed for all of the obtained number of pages, and terminates this flow. By the processes up to this point, a single code can be embedded in each of the fifteen pages represented by the imposition data.

Figure 21A:
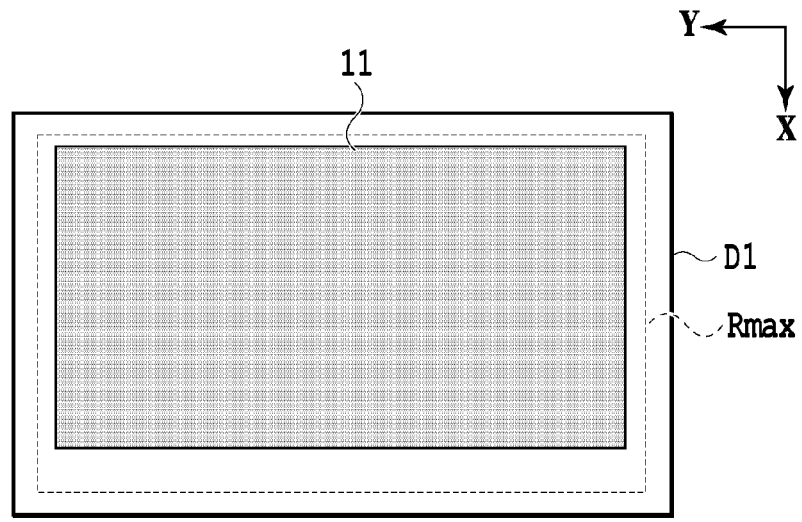
FIGS. 21A to 21C are diagrams describing steps in a flow of determining an embedding position in a first page.
Figure 21B:
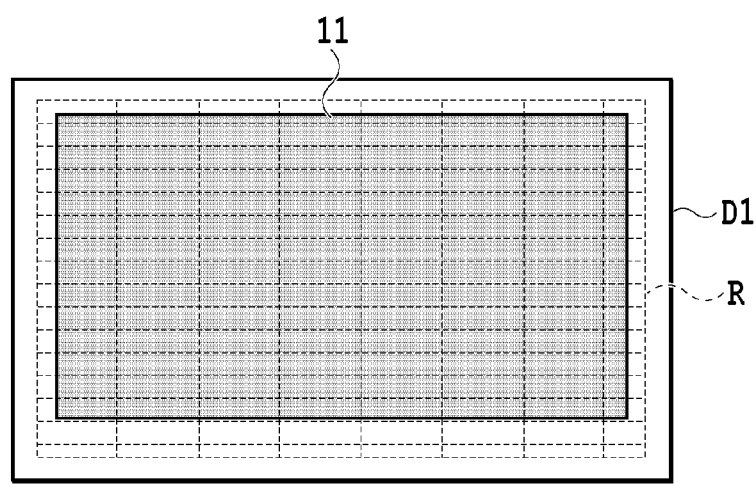
Figure 21C:
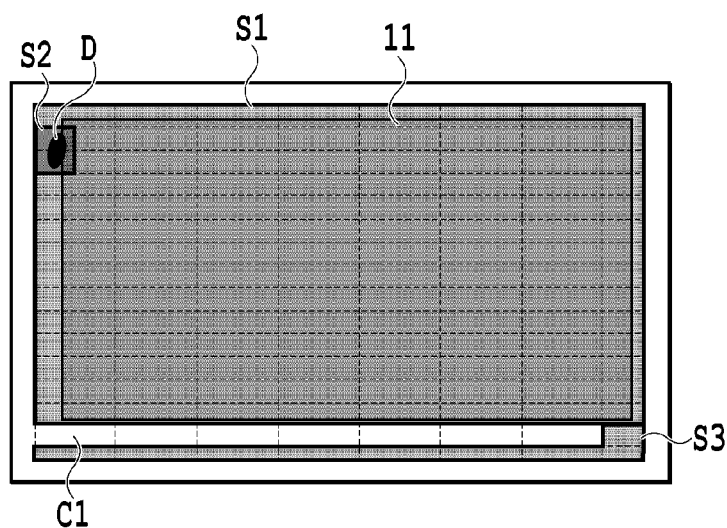

FIGS. 21A to 21C are diagrams describing the states of the candidate region R in steps in FIG. 13 representing details of the flow of S1906. A case of determining a position in the first-page data D1 in FIG. 20 will be described.

In S1301, the host device HC1 sets a candidate region R for the code embedding position. FIG. 21A is an example of $R_{max}$ representing a case when the candidate region R has the maximum size. As described in Embodiment 1, $R_{max}$ represents a region where a code can be printed. In the present embodiment too, the candidate region R is set to be the region $R_{max}$. In S1302, the host device HC1 divides the candidate region R into a grid pattern.

FIG. 21B illustrates a state where the candidate region R is divided into a grid pattern. As with Embodiment 2, the size of the division may be determined as appropriate. In S1303, the host device HC1 performs a process of narrowing down the divided grid cells. As with Embodiments 1 and 2, the flow in FIG. 15 is used to perform the narrowing. As described in Embodiment 1, a collection of grid cells S1 including at least part of the image region, a collection of grid cells S2 including at least part of a defect region D, and a collection of grid cells S3 having varying grid cell sizes in the vertical and horizontal directions are excluded from the candidate region R.

FIG. 21C is a diagram describing a state after the narrowing. Candidate embedding positions R for m=1, i.e., the first page, are updated to the remaining region after the exclusion of S1, S2, and S3. In the present embodiment, it can be observed that, as a result of the above process, there are only seven grid cells left as the candidate code embedding positions for m=1, i.e., the first page, as illustrated in FIG. 21C. Since M=15, fifteen codes must be embedded while there are only seven candidate positions. Thus, in this step for the first page, it is desirable to give feedback in S1903 described above and set L to 7 (L=7). Note that the value of the number L of pages in a predetermined interval may be set to a value equal to or less than the number of the candidate positions R.

In S1304, the host device HC1 selects one grid cell from the candidate region R narrowed down in S1303. The selected portion will be referred to as a code embedding region C. The selection method is not particularly limited. For example, the grid cells in the candidate region R may be numbered, and the grid cell with a randomly selected number may be selected. A region C1 indicated by a bold frame in FIG. 21C is illustrated as the grid cell selected here and represents a region to embed a code in the first-page data D1.

In S1305, the host device HC1 stores coordinates of the region C1. The coordinates of the upper left corner of the region C1 (X1, Y1) and the coordinates of the lower right corner (X2, Y2) are stored to save the rectangular region of the image. While the count of one is 1 to L, coordinates are accumulated and stored for each one. Then, the host device HC1 terminates the process of determining the code embedding position. By executing the above processes, the seven positions in the candidate embedding region R illustrated as white regions in FIG. 21C are selected and embedded with codes one by one for the first to seventh pages. From the eighth page, the embedding of codes starts from the embedded region in the first page again.

As described above, according to the present embodiment, even in a case when there are not many grid cells in the candidate region R to embed codes, the codes are embedded at positions that are different to some extent. Since this reduces the possibility of a defect continuing to overlap codes, the possibility of succeeding in executing the normal inspection is increased.

OTHER EMBODIMENTS

Embodiments 1, 2, and 3 have been described using the imposition data depicted in FIGS. 12, 18, and 20, respectively. In the examples described, codes are embedded into these imposition data by embedding a single code for each page. However, the advantage is not limited to this case. Specifically, in a case of embedding a plurality of codes into each single page, a similar advantage can also be achieved as long as the plurality of code embedding positions in each page do not overlap those in another page(s). In the case of embedding a plurality of codes into each single page, some of the plurality of codes may contain the same information.

In the above embodiments, the collection of grid cells S1, including an image region, is excluded from the candidate region R. However, the present invention is not limited to this case. For example, in S1502, the non-image region may be excluded from the candidate region R. In this case, only the image region is the candidate region R, and a position overlapping the image(s) is determined as the code embedding position. Regarding the method of embedding a code at a position overlapping the image(s), it is preferable to use an electronic watermark technique using multiplexing as described in Japanese Patent Laid-Open No. 2019-009733, for example. The electronic watermark technique using multiplexing is a technique for embedding non-image additional information into an image on a printed product in a visually unrecognizable fashion. A code can be embedded into an image region by utilizing this technique to embed a visually unrecognizable inspection code into an image. Incidentally, in the case of embedding a code by multiplexing, the document data as the comparison target in the inspection may be the data after the code is embedded or the data before the code is embedded. To achieve higher inspection accuracy, the document data before the code is embedded is desirably used so that the occurrence of an error, or the like, due to the multiplexing can be prevented. Also, in the case of using the document data after the code is embedded, the portion where the code is multiplexed may be excluded from the inspection target positions. In this way, it is also possible to prevent the occurrence of an error, or the like.

In FIG. 15, describing the process of narrowing down the candidate region R for a code embedding position, the image region, known defect region, and region(s) already embedded with a code are excluded from the candidate positions R. In addition to these, a region to print various check patterns for checking printing performance may be excluded as well. The various check patterns here include a check pattern for adjusting the relative print positions for the plurality of ink colors to be used in printing. The various check patterns are not limited to this, and may include a nozzle check pattern for checking whether the inks are normally ejected from the nozzles of the print heads 30. Besides the above, the various check patterns may also include a color monitoring pattern for checking the hue or the density of print regions for the nozzles of the print heads 30.

In the case of not excluding the region to print the above-described various check patterns, a position overlapping any of the check patterns may be determined as the code embedding position. In the case of embedding a code at the position overlapping any of the check patterns, it is desirable to generate data such that the check pattern in the code embedding region will not be printed and the code will be preferentially printed. This is because the various check patterns are to be printed in each page and, under the condition of the embodiments, under which the code embedding position is not fixed, there will be an opportunity to print the check patterns in their region in some pages. The inspection codes, on the other hand, need to be associated with respective pages in the document data, which makes it impossible to print one inspection code in a different page. Thus, in the case when a position overlapping any of the various check patterns is determined as the code embedding position, it is desirable to prioritize the printing of the code.

In the embodiments, the inks used in the description are assumed to be ones containing color materials. However, the components of the inks are not limited to these. For example, an invisible ink may be used. An invisible ink is, for example, an ink having such characteristics that it cannot be recognized as a color under visible light, e.g., sunlight, or the like, but emits fluorescent light in a visible light range in response to irradiation with a particular wavelength, such as that of ultraviolet radiation. In the following, a description will be given using an invisible ink that emits light in response to irradiation with ultraviolet radiation as described above.

In Embodiments 1, 2, and 3, the type of ink for printing codes may simply be replaced with the invisible ink and, at the time of reading a code, the region where the code is printed may be irradiated with ultraviolet radiation. In this way, it is possible to perform an inspection and, thus, achieve a similar advantage.

Consider S1501 and S1502 in FIG. 15 describing the process of narrowing down the candidate region R for a code embedding position. In the embodiments, the collection of grid cells S1, including an image region, is excluded from the candidate region R. However, this step may be skipped in the case of printing the code with the invisible ink. In other words, the code embedding position can be either the image region or the non-image region. In this case too, by irradiating the region where the code is printed with ultraviolet radiation at the time of reading the code, it is possible to perform an inspection and, therefore, achieve a similar advantage.

In the case of using the invisible ink to print a code too, the non-image region may be excluded from the candidate region R. In this case, the code is printed only in the image region, but a similar advantage can be achieved. As described above, even in the case of using the invisible ink to print codes, a similar advantage can be achieved as long as the print positions of these codes are different.

In the embodiments, a sheet-fed printing system is assumed. However, the advantage is not limited to this type. The embodiments are effective as long as the position of the code to be embedded into each of pages represented by imposition data is not fixed. Thus, the print medium to be actually printed may be roll paper.

In the above embodiments, the printing unit 3 includes line heads that perform full-line multi-head printing on a print medium in a sheet form or a print medium in a web form, but may have a single print head 30. That is, the print head 30 does not have to be a full-line head, and may be of a serial type that forms an ink image by ejecting an ink from the print head 30 while moving a carriage detachably carrying the print head 30 relative to the printing apparatus in the Y direction. In the case of performing the serial printing too, if a member as below has trouble on a portion thereof, a defect may appear at a fixed position corresponding to the position of the trouble. Examples of the member include a conveyance roller and a discharge roller that convey a print medium P, spurs that follow these to rotate in contact with the print medium P, a platen that supports the back surface of the print medium P, a guide rail for scanning the carriage on which the print head is mounted, and so on.

The conveyance mechanism for the print medium P may employ another method such as one in which the print medium P is nipped and conveyed by a pair of rollers. With the method such as one in which the print medium P is conveyed by a pair of rollers, a roll sheet may be used as the print medium P, in which case, the roll sheet may be cut after transfer to produce a printed product P'. In the above embodiments, the transfer member 2 is provided on the outer peripheral surface of the transfer drum 41. However, another configuration may be employed such as one in which the transfer member 2 is formed in the shape of an endless belt and run cyclically.

In the embodiments, inspection codes are generated by the print data generation unit 202 of the host device HC1, which is an information processing apparatus. However, by receiving the document data from the host device HC1 or another apparatus, the inspection codes can be generated by the main controller 13A of the printing apparatus 1A.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   one or more circuits; or
   one or more processors and at least one memory, the at least one memory being coupled to the one or more processors and, having stored therein, instructions executable by the one or more processors,
   wherein at least one of the one or more circuits or the execution of the instructions causes the information processing apparatus to function as:
      a code generation unit configured to generate a code for identifying one or more images in a piece of imposition image data representing a print region with the images arranged therein;
      a determination unit configured to determine candidate regions in the print region serving as candidates for placing the code, so that the codes in the print regions in pages represented by a plurality of pieces of the imposition image data will not be printed at a same position;
      a print data generation unit configured to generate print data based on the imposition image data so that the code will be placed in at least one of the candidate regions determined by the determination unit, wherein the print data generation unit generates the print data so that, up to a predetermined number of pages represented by pieces of the imposition image data, a print position of the code is same in a first page and a second page following the first page and, at a point at which the predetermined number of pages represented by the pieces of the imposition image data is reached, the print position of the code is different in the first page and the second page; and
      an output unit configured to output the generated print data to a printing apparatus.

2. The information processing apparatus according to claim 1, wherein the determination unit excludes, from the candidate regions, an image placement region in the piece of the imposition image data where the images are placed.

3. The information processing apparatus according to claim 1, wherein the determination unit excludes, from the candidate regions, a region determined as a defect region by a sensor that checks a printed state and obtained from the printing apparatus.

4. The information processing apparatus according to claim 1, wherein the determination unit excludes, from the candidate regions, a region to print various check patterns for checking printing performance.

5. The information processing apparatus according to claim 4, wherein, in a case when the region to print the various check patterns and the print position of the code overlap, the print data generation unit generates the print data so that the code will be preferentially printed.

6. The information processing apparatus according to claim 4, wherein the various check patterns include a check pattern for adjusting relative print positions for a plurality of ink colors to be used in printing, a nozzle check pattern for checking whether an ink is normally ejected from nozzles of a print head, or a color monitoring pattern for checking a hue or a density of print regions for the nozzles of the print head.

7. The information processing apparatus according to claim 1, wherein the print data generation unit generates the print data so that the code will be printed in the region where the images are placed by using an invisible ink.

8. The information processing apparatus according to claim 1, wherein the print data generation unit generates the print data so that the code will be printed by using an invisible visible ink and multiplexing.

9. The information processing apparatus according to claim 1, wherein the printing apparatus performs transfer-type printing using intermediate transfer members attached intermittently to a surface of a transfer drum, and
   the predetermined number of pages represented by pieces of the imposition image data is the number of the intermediate transfer members.

10. The information processing apparatus according to claim 9, wherein the printing apparatus includes line heads that perform full-line multi-head printing on a print medium in a sheet form or a print medium in a web form.

11. The information processing apparatus according to claim 9, wherein the printing apparatus includes a line head that performs serial printing in which the line head is moved relative to a print medium in a sheet form or a print medium in a web form.

12. The information processing apparatus according to claim 10, wherein the candidate regions are unit grid cells divided so as to have a length greater than or equal to a size of an ejection substrate forming the line head.

13. The information processing apparatus according to claim 1, wherein the candidate regions are unit grid cells divided so as to have a length greater than or equal to a size of the code.

14. The information processing apparatus according to claim 1, wherein the print data generation unit places a plurality of the codes in a page represented by a piece of the imposition image data.

15. A method of controlling an information processing apparatus, the method comprising:
  generating an inspection code to be sent to a printing apparatus, the inspection code containing information on original image data of a piece of imposition image data representing one or more arranged images;
  determining a candidate region in the piece of the imposition image data for placing the code; and
  generating print data so that the code will be placed in the candidate region determined in the determining,
  wherein the determining includes determining the candidate region so that print positions of the codes to be placed in a plurality of pieces of the imposition image data representing a plurality of pages are not a same position, and
  the generating includes generating the print data so that, up to a predetermined number of pages represented by pieces of the imposition image data, a print position of the code is same in a first page and a second page following the first page and, at a point at which the predetermined number of pages represented by the pieces of the imposition image data is reached, the print position of the code is different in the first page and the second page.

16. A non-transitory computer readable storage medium storing a program that causes a computer to operate as:
  a code generation unit configured to generate a code for identifying one or more images in a piece of imposition image data representing a print region with the images arranged therein;
  a determination unit configured to determine candidate regions in the print region serving as candidates for placing the code, so that the codes in the print regions in pages represented by a plurality of pieces of the imposition image data will not be printed at a same position;
  a print data generation unit configured to generate print data based on the imposition image data so that the code will be placed in at least one of the candidate regions determined by the determination unit, wherein the print data generation unit generates the print data so that, up to a predetermined number of pages represented by pieces of the imposition image data, a print position of the code is same in a first page and a second page following the first page and, at a point at which the predetermined number of pages represented by the pieces of the imposition image data is reached, the print position of the code is different in the first page and the second page; and
  an output unit configured to output the generated print data to a printing apparatus.

17. A printing system comprising:
  an information processing, wherein the information processing apparatus includes:
  one or more circuits;
  or one or more processors and at least one memory, the at least one memory being coupled to the one or more processors and, having stored therein, instructions executable by the one or more processors,
  wherein at least one of the one or more circuits or the execution of the instructions causes the information processing apparatus to function as:
    a code generation unit configured to generate a code for identifying one or more images in a piece of imposition image data representing a print region with the images arranged therein;
    a determination unit configured to determine candidate regions in the print region serving as candidates for placing the code, so that the codes in the print regions in pages represented by a plurality of pieces of the imposition image data will not be printed at a same position;
    a print data generation unit configured to generate print data based on the imposition image data so that the code will be placed in at least one of the candidate regions determined by the determination unit, wherein the print data generation unit generates the print data so that, up to a predetermined number of pages represented by pieces of the imposition image data, a print position of the code is same in a first page and a second page following the first page and, at a point at which the predetermined number of pages represented by the pieces of the imposition image data is reached, the print position of the code is different in the first page and the second page; and
    an output unit configured to output the generated print data to a printing apparatus; and
  a printing apparatus, wherein the printing apparatus includes:
  one or more circuits; or
  one or more processors and at least one memory, the at least one memory being coupled to the one or more processors and having stored thereon instructions executable by the one or more processors, wherein at least one of the one or more circuits or the execution of the instructions causes the printing apparatus to function as:
    a printing unit configured to perform printing based on the print data; and
    an inspection unit configured to read a printed product and to inspect the printed product by using the code.

* * * * *